US008601580B2

(12) United States Patent
Hansen et al.

(10) Patent No.: US 8,601,580 B2
(45) Date of Patent: Dec. 3, 2013

(54) SECURE OPERATING SYSTEM/WEB SERVER SYSTEMS AND METHODS

(76) Inventors: Robert S. Hansen, Austin, TX (US); James A. Flom, Austin, TX (US)

( * ) Notice: Subject to any disclaimer, the term of this patent is extended or adjusted under 35 U.S.C. 154(b) by 169 days.

(21) Appl. No.: 13/325,347

(22) Filed: Dec. 14, 2011

(65) Prior Publication Data

US 2013/0160084 A1 Jun. 20, 2013

(51) Int. Cl.
*H04L 29/06* (2006.01)

(52) U.S. Cl.
USPC .......................................................... 726/22

(58) Field of Classification Search
None
See application file for complete search history.

(56) References Cited

U.S. PATENT DOCUMENTS

| | | | | |
|---|---|---|---|---|
| 8,353,031 | B1* | 1/2013 | Rajan et al. | 726/22 |
| 8,424,078 | B2* | 4/2013 | Accapadi et al. | 726/17 |
| 2004/0226019 | A1* | 11/2004 | Tucker et al. | 719/310 |
| 2007/0180509 | A1* | 8/2007 | Swartz et al. | 726/9 |
| 2007/0283147 | A1* | 12/2007 | Fried et al. | 713/167 |
| 2010/0118324 | A1* | 5/2010 | Tagawa | 358/1.13 |
| 2012/0216281 | A1* | 8/2012 | Uner et al. | 726/23 |

OTHER PUBLICATIONS

Kamp, "Jails: Confining the omnipotent root", 2000, The FreeBSD Project, pp. 1-15.*
Noordende, "A Secure Jailing System for Confining Untrusted Applications", 2007, Security and Cryptography—SECRYPT, pp. 414-423.*

* cited by examiner

*Primary Examiner* — Benjamin Lanier
(74) *Attorney, Agent, or Firm* — The Villhard Patent Group

(57) ABSTRACT

Systems and methods for securely operating web servers, operating systems, etc. Methods of embodiments include creating virtual roots for executive jails and corresponding administrative jails within parent operating systems. Embodiments also include setting privileges associated with each of the executive jails to disk read-only. Moreover, administrative jails are hidden from executive jails and the parent operating system is hidden from both sets of jails. Also, the methods include cross mounting user configuration information and/or applications from the administrative jails and in to the corresponding executive jails. Methods can include password protecting the administrative jails and/or restricting the executive jails from initiating outbound communications. Methods can also include storing security related syslog data in locations associated with parent file structure of the parent operating systems. Methods can also include storing web log related syslog data in locations associated with the administrative jails thereby providing, as desired, compliance/auditing reporting functions.

20 Claims, 6 Drawing Sheets

SECURE OPERATING SYSTEM/WEB SERVER SYSTEMS AND METHODS

BACKGROUND

Malicious users can represent not just a nuisance but an outright threat to the well-being of many companies. More specifically, companies (and for that matter any organization) that rely on the Internet or other wide area networks to communicate with their customers, vendors, government agencies, employers, etc. stand vulnerable to a vast variety of hacking related threats. For instance, take a company that has a web site hosted on a third party web server. If a malicious user evades the security measures protecting the application, that malicious user (colloquially termed a "hacker") can harm, steal, copy, delete, etc. sensitive files, applications, and other information associated with the web site, the users of the web site, and/or the company.

For instance, malicious users can execute cross site request forgeries (CSRF) to take unauthorized actions while acting as or impersonating (electronically) another user. In other cases, local-file-inclusion, remote-file-inclusion (LFI/RFI), command injection and/or structured query logic (SQL) injection hacking techniques can allow malicious users to execute malware or harmful code on hosted web sites. Moreover, if a malicious user somehow manages to access the administrative functions of one web site, that malicious user might be able to use that control to access yet other web sites controlled by that administrative function thereby pivoting from one security breach to another and multiplying the potential for harm. The malicious user's imagination is the only thing limiting the damage likely from such attacks and this is more so the case if that malicious user somehow accesses the administrative rights of the underlying operating system. In such cases, the malicious user could do severe damage, and even cover their tracks (by, for instance, erasing or altering security related audit trails).

Moreover, once having mis-appropriated administrative rights, malicious users sometimes install and/or modify system binaries to install rootkits. By doing so they can create backdoors in to the compromised system that allows them to maintain access to the same despite corrective measures geared toward the more apparent harm that they might have caused. One consequence of these types of breaches is that they can modify the web application to log or copy passwords or other personally or financially sensitive information for subsequent mis-use. In other hacking-related scenarios, malicious users might cause a hosted web site (or other system) to generate voluminous outbound traffic (for instance, spam) much of which often carries malicious software itself. In this latter case, the hosted system becomes a "zombie" or "bot" denying or limiting its usefulness to the owner/operator. The foregoing represents a small sampling of the vast array of threats that on-line systems face.

BRIEF DESCRIPTION OF THE FIGURES

The detailed description is described with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses systems, apparatus, methods, etc. for securing operating systems, web servers, etc. and more specifically system, apparatus, methods, etc for securing operating systems and/or web servers by creating administrative jails and executive jails from their parent operating systems and mounting user applications from the parent operating system to the administrative jails and cross mounting them into the executive jails.

To the accomplishment of the foregoing and related ends, certain illustrative aspects are described herein in connection with the annexed figures. These aspects are indicative of various non-limiting ways in which the disclosed subject matter may be practiced, all of which are intended to be within the scope of the disclosed subject matter. Other advantages and novel features will become apparent from the following detailed disclosure when considered in conjunction with the figures and are also within the scope of the disclosure.

Figure 1:
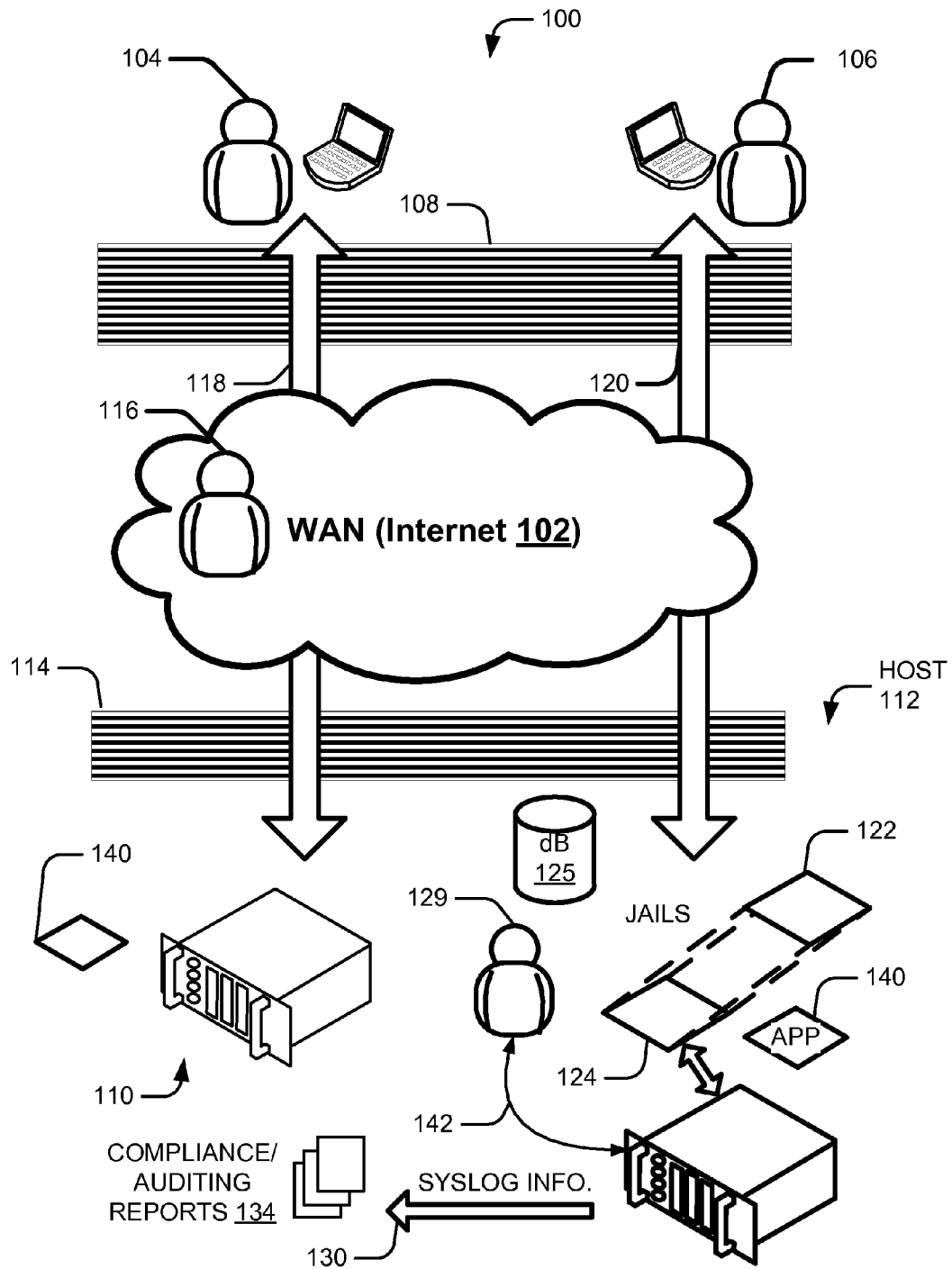
FIG. 1 illustrates a system of some embodiments.

FIG. 1 illustrates a system of some embodiments. FIG. 1 illustrates system 100, a portion of the Internet 102, various non administrative users 104, a malicious user 106, a user firewall 108, one or more conventional hosts 110, a host 112 of the current embodiment, a network and/or a host firewall 114, a "man in the middle" 116, conventional communications 118, and communications 120 in accordance with the current embodiment. Moreover, FIG. 1 illustrates that the host 112 of the current embodiment includes a plurality of executive jails 122, administrative jails 124, and application databases 125. In the current embodiment, the host 112 also generates certain monitoring data (syslog data 130), compliance/auditing reports 134, and hosts various user applications 140.

Typically, user applications 140 and associated application databases 125 provide some functionality for various non administrative users 104. Moreover, administrative users (not shown) associated therewith have responsibility for these user applications 140, application databases 125 and the sought after functionality. These user applications 140 (and application databases 125) reside in or execute in the hosts 110 and/or 112. As such, if the user applications 140 (or application databases 125) become vulnerable to malicious activities, the subsequent actions of the user applications 140 can harm, or enable harm to, conventional hosts 110. Thus, for a host 110 or 112, these user applications 140 themselves represent a source of vulnerability. Yet, users often desire to use these user applications 140 on hosts 110 and 112 that are readily accessible to all.

Non administrative users 104 also usually desire to use the Internet 102 (or some other wide area network (WAN)) to connect their computing and communications devices to various hosts 110 using conventional communications 118 to conduct business, exchange information, etc. with other users. They often perform such actions via the user applications 140 and application databases 125. As such, these non administrative users 104 want their interactions with the hosts 110 and 112 to be secure. However, various man in the middle 116 and other malicious users 106 interfere with, intercept, and/or mis-direct conventional communications 118 and/or otherwise hack into conventional host 110 with their own computing and communication device. Moreover, these malicious users 106 often persist in their attacks and often use sophisticated, even clever, techniques while attempting to fulfill their purposes. Furthermore, they often wish to remain anonymous with their activities going undetected whenever they can arrange for such circumstances.

As a result, systems 100 often employ user firewalls 108 associated with the computing devices that the non administrative users 104 use to communicate over the Internet 102. Various conventional hosts 110 also employ network and/or host firewalls 114 at the hosts 112, web servers, and other locations within system 100. These firewalls 108 and 114 and other conventional security hardware, software, firmware, techniques, technologies, etc. attempt to detect, identify, and/or eliminate hacking threats from the malicious users 106. But, conventional hosts 110 (and the often sensitive information, user applications 140, web sites, etc. which they contain or host) remain vulnerable to malicious users 106 because the user application 140 is itself vulnerable. Its vulnerability might arise from malicious activity, its own design/programming (if it fails to meet good design/programming practices and in some cases even if it does meet these practices), and even from potentially errant actions of certain valid users (even if they act without harmful intent), etc.

As is disclosed further herein, embodiments provide hosts 112 which employ executive jails 122 and administrative jails 124 to handle the communications 120 between the non administrative users 104 and the user applications 140 residing in the hosts 112 and to execute the user applications 140 themselves. Hosts 112 allow non administrative users 104 to access executive jails 122 and perform operations with the application databases 125 and/or user applications 140. Should read/write operations in the hosts 112 be desired or caused by activities of the non administrative users 104, the hosts 112 operate in such a manner that these read/write operations occur within the contexts associated with the executive jails 122, the administrative jails 124, user applications 140, and/or the application databases 125. In addition, and usually on a pre-arranged basis, hosts 112 will allow a write operation to itself, its system disk, or its underlying operating system. That is, system disk writes typically occur only with the consent and cooperation of the host administrative user 129. But, in most situations, write operations are only permitted to the application databases 125 (for non administrative users 104 and through the user applications 140) and to the programming or coding or other administrative features of the user applications 140 (for administrative users).

Thus, for instance, if the host 112 is a web server hosting a particular web site and/or user applications 140, the host associates an administrative jail 124 and a corresponding executive jail 122 with that web site. Host 112, acting as a parent operating system, maintains two copies of the web server or other user applications 140 with one residing in the administrative jail 124 and the other executing (or being executable) in the executive jail 122. These two copies are typically mirror copies of each except for 1) the difference(s) between and/or caused by the configuration files mounted in the administrative jail 124 and those cross mounted into the executive jail 122 and 2) changes which the administrative user might be making to the administrative copy.

Typical non administrative users 104 without administrative privileges to the web site) interact with the web site via the executive jail 122. Administrative users (with administrative rights to the web site, its underlying user applications 140, information, etc.) interact with the web site via the administrative jail 124. This bifurcation of the web site and/or other features of the current disclosure prevent man in the middle 116 and other malicious users 106 from performing many known hacking techniques on hosts 112 of embodiments and its contents, resources, etc. More specifically, the host 110 separates them at the network or host firewall 114 so that administrative users are white listed via their IP address or via a virtual private network (VPN) (or both) so that the host 110 can identify them as such. Furthermore, by bifurcating the administration and execution of the user applications 140, embodiments allow the hosts 112 to isolate such activities within the appropriate jails 122 and 124. Actions that should occur in one jail 122/124, but that do occur within the other jail 124/122 can therefore trigger an investigation and/or corrective action by the hosts 112.

Moreover, FIG. 1 illustrates that the host administrative user 129 of embodiments can oversee and/or monitor the operation of the host 112 and/or the stack of protocols, techniques, entities, etc. associated therewith. More specifically, the host administrative user 129 can monitor the operation of the executive jails 122, the administrative jails 124, the users (with and without administrative privileges), malicious users 106, and other aspects of the system 100 in general and, more specifically, the hosts 112. The host administrative user 129 is not necessarily a user in the sense of a non administrative user 104 or an administrative user with responsibility for running one (or some subset of the user applications 140 and/or web sites) on the host 112. Although, if so desired, the host administrative user 129 could access an executive jail 122 as a non administrative user 104 (and, therefore, without privileges) to assess how the host 112 appears to be running from such a perspective. To perform administrative duties related to the host 112 itself, though, a host administrative user 129 accesses the host 112 (and/or parent operating system) via a separate administrative network 142 in communication therewith. Host administrative users 129 can therefore log into the host 112 and then access (using their over-arching administrative privileges) the executive and administrative jails 122 and 124 to identify and address various issues. Otherwise, they typically have no specific duties associated with any specific user application 140 or application database 125.

Figure 2:
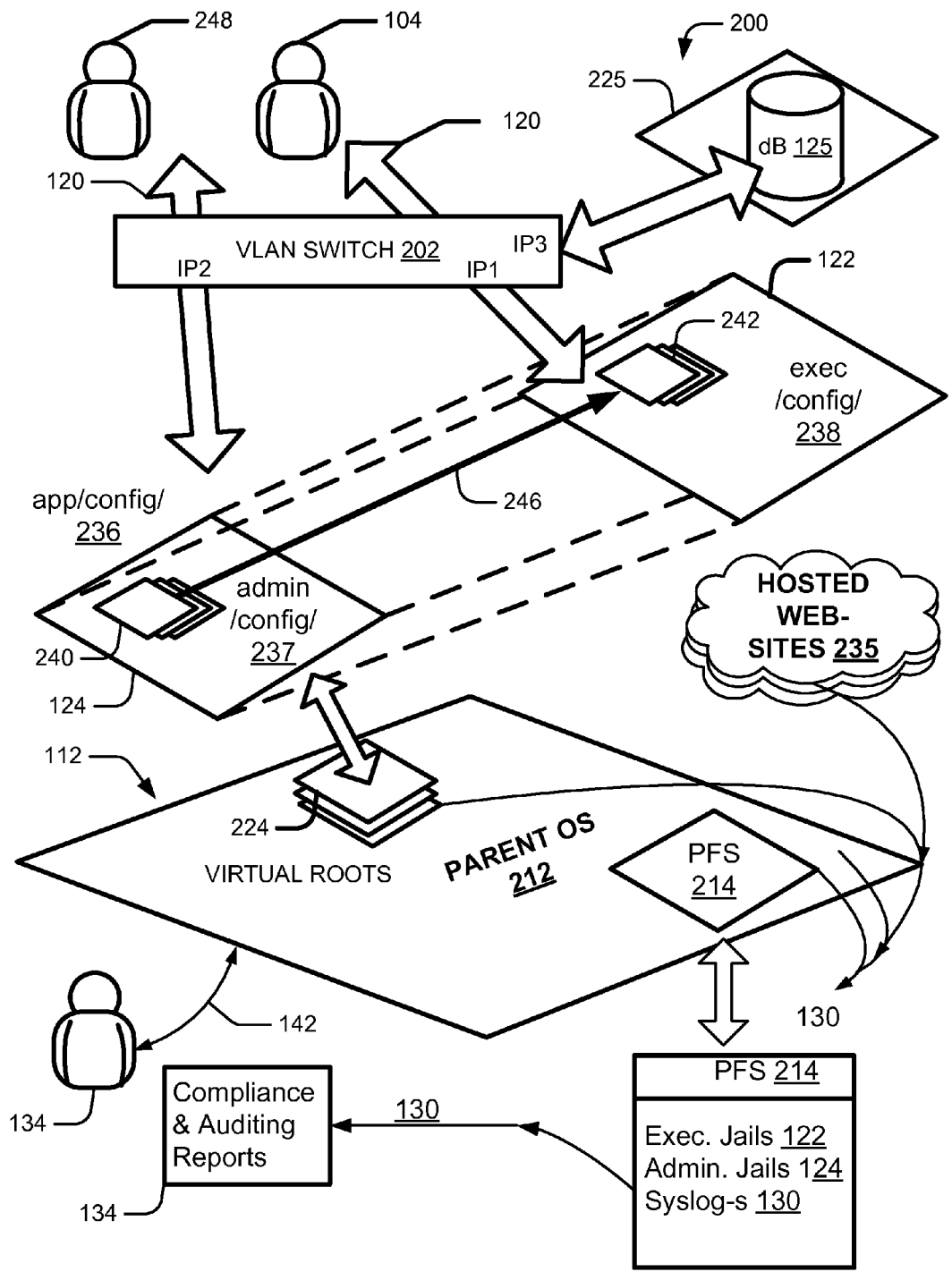
FIG. 2 illustrates a stack of some embodiments.

It might also be worth noting before turning to a more detailed discussion with respect to FIG. 2 that hosts 112 of various embodiments can monitor syslog data 130 (and/or similar data) related to security and web logging to detect, identify, correct for, etc. malicious attacks and/or other unusual activity within or associated with host 112. Indeed, in some embodiments, hosts 112 use such syslog data 130 to generate compliance/auditing reports 134 for Health Insurance Portability and Accountability Act (HIPAA), Gramm-Leach-Bailey Act (GLBA), Sarbanes-Oxley Act, Payment Card Industry Data Security Standard (PCI DSS), etc. purposes related to the host 112. These reports can be run on demand, on a scheduled basis, or as detected changes suggest that a report might be warranted. Moreover, because of various features of the hosts 112, these compliance/auditing reports 134 enjoy greater security themselves and provide better post-forensic capabilities than hosts 110 heretofore available as well.

Stacks

FIG. 2 illustrates a stack of some embodiments. The stack 200 can be a portion of system 100 and can be used to host various user web sites, user applications 140, application databases 125, etc. Thus, the stack 200 includes a number of objects, data directories, files, applications, etc. and operates under certain protocols such as, for illustrative purposes, the transfer control protocol/Internet protocol (TCP/IP) to serve the hosted user applications 140. Indeed, in a cloud environment, the stack 200 sometimes faces the Internet 102 through a host firewall 114 and/or a network firewall so that users can access those resources while the host 112 enjoys some protection from malicious attacks courtesy of those firewalls. Of course, other implementations are within the scope of the current disclosure.

With ongoing reference to FIG. 2, the stack 200 can be considered to include the parent operating system 212, the parent file structure 214, system binaries, etc. and is at least in some respects the operational part of the host 112. The stack 200 also controls access to the parent operating system 212 and parent file structure 214. Indeed, it can hide the parent operating system 212 from non administrative users 104, malicious users 106, administrative users 248, and from user and administrative jails 122 and 124 respectively. And, if desired, the stack 200 can be said to include the network and/or host firewalls 114 of some embodiments.

But, as noted with reference to FIG. 1, certain malicious users 106 will at times attack the stack 200 and/or the user applications 140. In other situations, the user applications 140 can behave as if they were malicious due to its design, programming, security features, etc. which not meeting good design/programming practices. As a result, once a malicious user 106 has gained local access in some way (perhaps through the user applications 140 or flaws thereof) they are sometimes able to pivot and attack the stack 200 (typically using RFI/LFI or command injection techniques if perimeter security stopped more direct attacks). As is disclosed further herein, certain aspects, features, etc. of the stack 200 of various embodiments eliminate or, if not, mitigate the risks of such attacks and malicious-like behavior from user applications 140 which fail to meet good design/programming practices, and malicious-like behavior by various non administrative users 104 and/or administrative users (even if they act without harmful intent).

Thus, it might be useful to disclose some aspects, features, etc. of the stack 200 of the current embodiment. It might then be useful to disclose how these features operate together in the context of several methods while disclosing some of the results of these features and how they interact with each other. More specifically, the stack 200 of the current embodiment includes a parent operating system 212 residing and/or operating in a host device such as host 112. Furthermore, the scope of the current disclosure includes embodiments in which the host 112 resides in a virtual machine (VM) managed by a hypervisor as in some cloud environments.

The stack 200 of some embodiments also includes or defines a virtual local area network (VLAN) switch 202, a parent file structure 214, and virtual roots 224 and/or partitions therein for various executive jails 122 and for the corresponding administrative jails 124 respectively. The executive jails 122 and administrative jails 124 often reside within the parent file structure 214 and inherit certain files and directories there from. Embodiments also provide database jails 225. The database jails 225 can also reside in virtual roots in the parent file structure 214. FIG. 2 also illustrates hosted web sites 235, an application configuration file 236, an administrative user configuration file 237, an executive version of a configuration file 238, an administrative version of a user application 240, a cross mounted and executable version of a user application 242, a cross mount arrow 246, and an administrative user 248.

Parent Operating Systems

As noted, in many cases the stack 200 provides the parent operating system 212 with which to indirectly run various user applications 140, programs, etc. and/or to perform other secure operations desired by certain non administrative users 104 and administrative users 248. In some cases, the parent operating system 212 hosts various hosted web sites 235 and/or user applications 140 as desired by one or more users and, (as is disclosed further herein), does so through the executive jails 122, administrative jails 124, and database jails 225. More specifically, the parent operating system 212 generally maintains mirror copies of the user applications 140 in the executive jails 122 and the administrative jails 124.

VLAN Switches

The stack 200 can employ a virtual image and a virtual local area network (VLAN) switch 202 so that if one portion of the stack becomes compromised, the compromise will have difficulty spreading. For instance, VLAN switch 202 can segment VLANS for each of the executive jails 122, administrative jails 124, and database jails 225. Moreover, the VLAN switch 202 allows stack 200 to block entities on one VLAN from seeing the other VLANs and entities, objects, resources, etc. therein. This segmentation results in a virtual firewall between the parent operating system 212 and users in the jails 122, 124, and 225.

VLAN switch 202 might or might not be a full-fledged switch in some hosts 112. For instance, if one or more of the application databases 125 reside in a separate (real) machine a full-fledged switch could be employed. This situation can occur when compliance, performance, etc. reasons suggest that a separate residency might be desirable. In other cases, hosts 112 could handle the functions of VLAN switch 202 locally since it can detect the IP addresses of those parties involved.

More specifically, VLAN switch 202 makes non administrative users 104 access the apparent hosted web sites 235 via one VLAN and the IP addresses IP1 associated with the applicable executive jail(s) 122. Meanwhile, VLAN switch 202 makes administrative users 248 access the apparent hosted web site 235 via another VLAN and addresses IP2 associated with the corresponding administrative jail 124. Moreover, VLAN switch 202 connects the database jails 225 to the executive jails 122 and to the administrative jails 124 via another VLAN and IP addresses IP3 associated with the database jails 225. Thus, users 104 and 248 operate within the jails 122 and 124 with access to the application databases 125 for both read and write operations to it as generally allowed by the user applications 140 and in compliance with permissions, privileges, etc. associated with the database jails 225. Moreover, the VLAN switch 202 performs these functions without allowing the various users knowledge of, much less access to, other hosted web sites 235 or jails residing in the stack 200 (unless host 112 permits knowledge of the other web sites 235).

Again, the bifurcation or segmentation of an apparent hosted web site 235 into the jails 122, 124, and 225 helps prevent man in the middle 116 from attacking the stack 200 or, at the least, limits the damage which they might be able to do should they partially succeed. More specifically, since the VLAN switch 202 segments the executive jails 122 and administrative jails 124 (and database jails 225) at the network and/or host firewall 114 level, the VLAN switch 202 can identify and white list administrative users 248 for access to their administrative jails 124 via the IP addresses from which they connect to the host 112. Similar considerations can apply to white listing the non administrative users 104 at the VLAN switch 202 for access to the executive jails 122. Virtual private network (VPN) technologies can be employed in the alternative, or in addition, toward further securing the jails 122, 124, and 225 from man in the middle 116 attacks.

User Configuration Files

As can be expected, non administrative users 104 and administrative users 248 have various responsibilities. As a result, the stack 200 associates user configuration files 237 and 238 with at least some of the administrative users 248 and at least some of the non administrative users 104. The user configuration files 237-238 define which resources of the stack 200 the users 104 and 248 are allowed to access and which types of activities they can perform with respect there to. Thus, some differences will exist between the administrative version of the hosted web sites 235 (residing in the administrative jails 124) and the executable versions of the hosted web sites 235 (executing in the executive jails 122). More specifically, the administrative versions of the user configuration files 237 in the administrative jails 124 will identify the administrative users 248 and their privileges while the executive versions of the user configuration files 238 in the executive jails 122 typically omit these details. But, the executive versions of the user configuration files 238 can identify the non administrative users 104 and their permissions in the executive jails 122. It might also be worth noting that the parent operating system 212 can allow administrative users 248 to spin multiple instances of executive jails 122 from one administrative jail 124 thereby further segregating non administrative users 104 into various categories for potentially separate and distinct handling. Such arrangements can also be convenient for administrative users 248 since they can maintain one administrative jail 124 that corresponds to many executive jails 122. Accordingly, the scope of the current disclosure is not limited by a one-to-one correspondence between executive jails 122 and administrative jails 124.

The differing versions of the user configuration files 237 and 238 can allow particular users 104 and 248 differing permissions between jails 122 and 124. Some of these user activities can occur within the context of, or in relationship with, the various underlying user applications 140 mounted from the parent operating system 212 into the administrative jails 124 and then cross mounted in to the executive jails 122. Of course, because of differences between the administrative versions of the user configuration files 237 in the administrative jails 124 and the cross mounted executive version of the user configuration files 238 in the executive jails 122, the corresponding versions of these applications 240 and 242 might behave differently in some situations. Thus, mounting arrow 246 illustrates the stack 200 having cross mounted an executable version of a user application 242 into an executive jail 122 from an administrative version of the user application 240 in an administrative jail 124.

Application Configuration Files

In many embodiments, the administrative jails 124 contain another configuration file, the application configuration file 236, which defines (at least in part) the allowed behavior of the administrative user applications 240 in the administrative jails 124 as it relates to various administrative users 248. However, the application configuration file 236 is not cross mounted to the corresponding executive jails 122. But, the administrative version of the user configuration file 237 is cross mounted into the executive jail 122 (without, though, typically conveying any information related to the administrative users 248, their configuration related information, and/or other jails 122 and 124).

The application configuration file 236 of embodiments often contains different usernames/passwords to the application database 125, different salts used for session tokens, etc. Moreover, the application configuration file 236 modifies the behavior of the user application 140 and/or application database 125 by granting/denying privileges, permissions, rights, etc. given to the various administrative users 248.

Configuration Files in General

It might be worth mentioning that configuration files 236 to 238 might not be in the form of a separate cohesive file, object, etc. Rather, these configuration "files" 236 to 238 can represent a collection or set of configuration related settings, parameters, permissions, privileges, etc. spread throughout the stack 200. Therefore, for the sake of convenience, these potentially disparate sets of configuration information will be referred to as configuration files 236 to 238 herein.

That being said, if an administrative user 238 is operating within the context of the administrative version of the user application 240 and wants to access the administrative version of the user configuration file 237, the administrative user 248 will find it located in the administrative jail 124. In contrast, a non administrative user 104 (or a malicious users 106) operating within the context of the more public and executable version of the user application 242 will at most find instead the less sensitive, executive user configuration file 238 (without information pertaining to administrative privileges or the un-cross mounted administrative versions of the user applications 240). Moreover, these two different versions of the configuration files 237 and 238 point to different locations on disk as the parent file structure 214 defines it thereby further complicating the task of a malicious user 106 who would likely want access to the administrative information in the administrative configuration files 236 and 238 if they knew that these files existed.

As a result, the administrative version of the user configuration file 237 can contain password files to the application database 125 and/or user application 140. Meanwhile, the other version of the configuration file 238 can also contain a separate password file to the application database 125 and/or user application 140. However, the password files in the two versions of the user configuration files 237 and 238 can be different and indeed often are. For instance, the administrative version of the configuration file 237 can contain an administrative username:password pair that gives some user (administrative user 248) read/write access to the application database 125 and the user application 140. Furthermore, the database jail 225 can restrict access to the application database 125 to deny users in the executive jails 122 the ability to connect to the application database 125 as administrative users 248. In that way, if a malicious user 106 (or non administrative user 104) is attempting to submit sensitive information such as credit card information using an executive jail-related user account for access to the application database 125 they can have write access into the application database 125 to do so. But, that malicious user 106 would be unable to access application database 125 with read privileges to access or steal existing credit card information therein.

Moreover, a malicious user 106 (or a typical non administrative user 104 using a user application 140 which might fail to meet good design/programming practices) who managed to compromise an executive jail 122 could not brute force a valid administrative password for the application database 125 and/or user application 140. Accordingly, the stack 200 prevents many types of SQL injection attacks or, in the alternative, limits such attacks to just those application database 125 tables that the non administrative user 104 has access privileges to (or has in some way gained access there to). Thus, at worst, an instance of one application database 125 associated with one underlying user application 140 might be temporarily compromised. But the stack 200 will limit the spread of the attack. Having addressed some aspects of the jails 122, 124, and 225, configuration files 236 to 238, and the administrative and executable versions of the user applications 240 and 242, some additional discussion regarding the network and/or host firewalls 114 might be in order.

Firewalls

With continuing reference to FIG. 2, and as mentioned previously, the stack 200 can include a network or host firewall 114 through which it selectively faces the Internet 102. The host firewall 114 can attempt to detect, identify, and prohibit malicious and/or unauthorized activity with respect to the stack 200 and, more specifically, sensitive information, programs, user applications 140 and associated application databases 125, etc. associated therewith. For instance, malicious users 106 often target, or cause damage to, the parent operating system 212 itself, its binaries (or components thereof), the various user configuration files 236 to 238, user applications 140, etc. contained therein.

Stacks 200 can also use host firewalls 114 to help prevent malicious users 106 in the executive jails 122 from connecting to the administrative jails 124 even if these jails 122 and 124 operate in the same machine. As a result, if such an attack occurs, the stack 200 can isolate it despite the attack not traversing an Ethernet cable or other physical connection between machines. Network firewalls, when employed, can also assist the stack 200 in deterring attacks in that they prevent malicious users 106 who have compromised a jail 122, 124, or 225 from pivoting and attacking applications in other jails 122, 124, or 225. Network and/or host firewalls 114 can also prevent an attack from pivoting to the administrative network 142 used to manage the physical machine(s) on which the stack 200 operates since the two interfaces (one for the public and one for the host administrative user 129) can be handled separately.

Despite the desire for security, many non administrative users 104 and administrative users 248 desire access to the resources of the system 100 and/or the stack 200. Accordingly, network and host firewalls 114 typically allow some access thereto while doing so in manners calculated to thwart or at least impede the activities of malicious users 106; user applications 140 that fail to comply with good programming practices; and/or users 104 and 248 who act in malicious-like ways (even if acting in some errant manner without necessarily having harmful intent). For instance, the host firewall 114 can allow typical non administrative users 104 access to the mounted and executable version of the user applications 242 in the executive jails 122 via protocols such as the hyper text transfer-secure protocol (HTTP/S), the HTTP Secure Socket Layer (HTTP-SSL) protocol, the HTTP Transport Layer Security (HTTP-TLS) protocol, the SPDY protocol, the Web Developers Virtual Library (WDVL) protocol, the HTTP Next Generation (HTTP NG) protocol, etc. as well as other protocols now in existence or yet to be developed. While the protocols, ports, etc. might change from implementation to implementation, the stacks 200 could remain similar to those as disclosed herein.

No matter the protocol(s) used, the network and/or host firewall 114 of the current embodiment can restrict access to the administrative jails 124 to only administrative users 248 with administrative privileges with respect to their corresponding administrative versions of the user applications 240 thereof. Moreover, the stack 200 can also provide similar protection for the administrative versions of the configuration files 236 and 237, directories, etc. in the administrative jails 124. These administrative versions of the configuration files 236 to 237 sometimes contain sensitive application database 125 related password files that (if accessed) would yield higher access privileges to the user application 140 and application database 125 than warranted for non administrative users 104 and others thereby possibly meriting such protective measures.

In some embodiments, administrative access for the administrative users 248 to the administrative jails 124 is provided via secure technologies such as the virtual private network (VPN), the secure socket shell or secure shell (SSH/HTTPS) protocols, and/or other protocols now in existence or yet to be developed. Moreover, SSH and HTTPS can be tunneled over a VPN connection such that administrative access to the administrative jails 124 is doubly encrypted (thereby rendering man in the middle 116 attacks particularly difficult to perform). Additional encryption methods could also be employed if desired.

For instance, perfect forward secrecy (PFS) techniques could be used to achieve multiple levels of encryption/security on top of less temporally secure services such as HTTPS. In some embodiments, moreover, mutual authenticated encryption techniques (in which the host 112 validates that a user is valid based on pre-shared keys and vice versa, instead of relying on public key infrastructure (PKI) technology) could be used. In some embodiments, various combinations of such techniques can be used. For instance HTTPS access over SSH tunnels over a VPN connection could be used. In such manners vulnerabilities in one security technology can be mitigated while still providing protection from the other layered techniques. It is noted here that many embodiments employ redundant security mechanisms at certain points in the stack 200 to make malicious attacks, and the like, exponentially more difficult to execute and/or exploit.

Furthermore, some embodiments implement such firewall related provisions through rules configured into the firewalls. Thus, not only can the user applications 140 be executed as-is, but if their execution reveals flaws in their design, new rules can be configured in to the firewalls to account for such flaws and/or thwart attacks allowed by vulnerabilities resulting there from. Moreover, if a vulnerability in a security technology surfaces, these redundant security technologies can plug the gap with a relatively simple re-configuration of the firewalls involved until a fix or patch becomes available.

Jails: Virtual Roots and Hiding

With continuing reference to FIG. 2, the host 112 has certain jail related features pertinent to preventing, impeding, or otherwise thwarting malicious and/or unusual activities. For instance, the host 112 creates virtual roots for the individual executive jails 122 from each other as well as other operating areas, data structures, etc. The host 112 also creates virtual roots for the individual administrative jails 124 (which correspond to the executive jails 122) from each other as well as the executive jails 122 themselves, and the other operating areas, data structures, etc. of the host 112. In addition, or in the alternative, the hosts create virtual roots associated from the jails 122 and 124 from which the users 104 and 248 cannot escape and mountings. For instance, in a UNIX environment chroot can be used to create these apparent root directories for the various jails 122 and 124. Because the jails 122 and 124 offer security on top of the virtual roots (for instance, those created via chroot) programs and users operating in the jails 122 and 124 cannot access files outside of the directories thereby created. Moreover, these benefits should occur regardless of the underlying operating system (for instance FreeBSD®, Windows®, Apple®, Unix®, Linux®, etc.) within which the jails 122 and 124 operate provided that it supports such functionality. Thus, unless otherwise provided for, activities occurring within any one, individual jail (whether an executive jail 122 or an administrative jail 124) cannot affect other jails 122 and 124 or areas of the host 112.

Moreover, activities in jails 122 and/or 124, operating areas, data structures, etc. of the host 112 cannot affect activities within an individual jail 122 or 124 of interest unless provided for otherwise.

In addition, hosts 112 of various embodiments hide their parent file structures 214. More particularly, the file system and binaries of hosts 112 cannot be accessed much less seen by users 104, 106, and/or 248 performing operations within the executive jails 122 and/or the administrative jails 124. Note that VLAN switch 202 effectively forces such users 104, 106, and 248 to access host 112 via the IP addresses IP1, IP2, and IP3 (associated respectively with the executive jail(s) 122, administrative jail(s) 124, and the application database jail(s) 225. More specifically, the actual address of the host 112 can be withheld from the public while address IP1-IP2 can be available to legitimate users 104 and 248. The addresses IP3 of the database jails 225 can likewise be withheld from the public since the VLAN switch 202 of embodiments handles communications therewith. Thus, the VLAN switch 202 hides the IP addresses associated with the host 112, the parent operating system 212, and/or the application databases 125 from outside scrutiny. As a result such users 104, 106, and 248 usually begin their activities within the context of the executive jails 122 and/or administrative jails 124 and not within the context of the underlying parent operating system 212 or the application databases 125.

In addition, the stack 200 hides the administrative jails 124 from the executive jails 122 so that users accessing (by any means) the executive jails 122 are unlikely to even realize that corresponding and separate administrative jails 124 might even exist. Furthermore, this result is true even after a malicious user 106 successfully compromises an executive jail 122 or a non administrative user 104 violates security in some manner, perhaps accidentally. Since the malicious user 106 or non administrative user 104 cannot see the administrative jail 124, the architecture of the stack 200 will probably befuddle them and leave them unable to create even a "temp" (temporary) file with which to further exploit their breach since they have no write privileges within the executive jail 122.

Host Administrative Users

As noted elsewhere herein, each host 112 can have associated therewith a host administrative user 129 with broad privileges to access, monitor, edit, control, re-configure, etc. features of the pertinent host 112 and/or jails 122, 124, and 225. For instance, the host administrative user 129 can patch and/or update the parent operating system 212 and the underlying user applications 140, install new applications, reconfigure the network and/or host firewall 114, the permissions of the jails 122, 124, and 225, the cross mountings of user applications 140, etc. These features allow the host administrative user 129 the ability to detect, investigate, mitigate, correct for, and/or mitigate unusual activities and malicious attacks against the host 112 and its resources.

Parent File Structures

FIG. 2 also illustrates the parent file structure 214 of certain embodiments. The parent file structure 214 defines a directory or file structure which includes the virtual roots 224 and/or partitions in which the executive jails 122 and administrative jails 124 reside. The partitions, though, are not necessary for the practice of the current disclosure. However, they do tend to eliminate or reduce outages and indeed all of the jails 122, 124, and 225 could share a partition (or not even be partitioned) and still be within the scope of the current disclosure. The parent file structure 214 also provides that the configuration files 236 to 238 reside in their appropriate virtual roots 224 and/or partitions thereby protecting them from malicious attacks or unusual activity in other partitions even if they exist as disparate sets of information. If the configuration files 236 to 238 are actually disparate sets of such information, the stack 200 can ignore those items supposedly in the set if they are found outside of the appropriate locations in the parent file structure 214. Of course, such an event itself might indicate that an unexpected change to the stack 200 occurred. Thus, the stack 200 could raise an alert or take some other corrective action.

The parent operating system 212 can be any type of operating system capable of supporting executive, administrative, and database jails 122, 124, and 125 including, but not limited to, the FreeBSD®, Windows®, Apple®, Unix®, Linux®, etc. operating systems. Among other activities related to hosting hosted web sites 235 and/or user applications 140, the parent operating system 212 can perform file management functions. In so doing, the parent operating system 212 interacts with the parent file structure 214 to determine which users 104, 106, 129, and 248 can perform various operations on these files. The parent operating system 212 can also store syslog data 130 and/or other data related to system 100 security (re-configurations, access attempts, etc.) In the alternative, or in addition, the parent operating system 212 can deliver syslog data 130 to appropriate administrative jails 124 or other locations inaccessible to non administrative users 104 (or malicious users 106 acting there as) if desired. For instance, while embodiments can deliver syslog data 130 to an executive jail 122, stacks 200 of many embodiments restrict delivery of syslog data 130 to locations other than the executive jails 122 such as the administrative jails 124 and/or a dedicated partition in the parent file structure 214.

Compliance/Auditting: HIPAA, GLBA, Sarbanes-Oxley, PCI DSS

The parent operating system 212 can also store information useful for HIPAA, GLBA, Sarbanes-Oxley, PCI DSS, etc. compliance/auditing purposes and the like. Moreover, because pre-existing syslog data 130 stored in the parent file structure 214 (or an administrative jail 124) cannot be tampered with after an executive jail 122 has been compromised, malicious users 106 cannot cover or destroy evidence of their activities. At best, a malicious user 106 might cause additional syslog data 130 to be appended to such pre-existing syslog data 130 but no alterations of the pre-existing information would result. Accordingly, such syslog data 130 can be deemed to be "forensically secured" against tampering by malicious user 106 and others.

In part because of the sensitive information stored in the parent operating system 212 and the capabilities access to it enables, the parent operating system 212 of embodiments controls all aspects of the executive jails 122 and the administrative jails 124 including the apparent hosted web sites 235 (and/or other user applications 140) running therein. For instance, these entities and the users operating therein must communicate through permissions granted by the firewall(s) and the configuration files 236 to 238 residing in the parent operating system 212.

Moreover, users on the Internet 102 cannot log into the parent operating system 212 itself because administration of the parent operating system 212 occurs over the administrative network 142. The administrative network 142 can sit on a virtual-LAN that differs from the one used to handle Internet-bound and/or Internet-originating traffic via VLAN switch 202. Moreover, the parent file structure 214 is hidden from the executive jails 122, the administrative jails 124, and/or users 104, 106, and 248 operating therein. Indeed, in some cases, host administrative user(s) 129 can be the only individual having access to the parent operating system 212 and/or parent file structure 214. As a result, malicious users 106 find their ability thwarted or at least impeded to sniff traffic; pivot to other machines (whether virtual or real) running similar stacks 200; brute force host administrative user accounts, etc.

Hosted Web Sites

Still with reference to FIG. 2, it might now be useful to disclose features of the hosted web sites 235. For one thing, each hosted web sites 235 of embodiments can appear to non administrative users 104 from outside of the stack 200 as if they were singular, coherent entity residing on the host 112. Indeed, the hosted web sites 235 appear to contain all user applications 140, files, information, functionality, etc. normally associated with a web site (or in the case of a standalone user application 140, corresponding features) as viewed by non administrative users 104.

But, the stack 200 allows non administrative users 104 from outside of the stack 200 read-only access to the cross mounted and executable user applications 242 residing in the executive jails 122. Moreover, if desired, such access can be by way of secure protocols such as, but not limited to, the HTTP/S protocol. In this manner, even non administrative users 104 can cause the execution of the cross mounted and executable user application 242 thereby obtaining the functionality of it which they seek. In contrast, there to, the stack 200 allows administrative access to the administrative versions of the user applications 240, and/or hosted web sites 235 via the administrative jails 124. Such administrative access, depending on the embodiment, can be by way of a combination of secure techniques such as the SSH-HTTP/S protocol and/or other protocols, techniques, etc since it allows administrative users 248 the ability to perform writes to the administrative user applications 240 (or, rather, its programming and/or coding), update hosted web sites 235, add additional modules/applications, etc. if desired.

File Ownership and Write Privileges

As mentioned elsewhere herein, parent operating systems can represent one vulnerability of many conventional operating systems. In part this is so because they define the partitions of their conventional stacks and the resources contained therein. As a result, malicious users 106 often target them for unauthorized editing, copying, theft, etc. They do so, many times, by mimicking or otherwise misappropriating the user identity (UID) of a valid user. In some embodiments, therefore, stacks 200 of the current embodiment prevent all users 104 and 248 who have valid UIDs from owning files More specifically, in some web server environments, administrative users 248 sometimes create files and give the ownership to some World Wide Web (www) or other Internet 102 user (for instance Apache®). Thus, if that file gets cross mounted between the two jails the stack 200 can prevent the UID from the administrative jail 124 and the UID in the executive jail 122 reflecting the same user. In some cases, the stack prevents such UIDs from being associated with any user 104 or 248 and/or performs cross checks to identify such situations. Accordingly, if the file (or code therein) becomes compromised and its read-only access has been disabled, the malicious users 106 apparently causing the change still will have no ability to modify the file because they don't own it. Nor does any other non administrative user 104 (within the corresponding executive jail 122). Thus, in embodiments, such files are associated to a UID that has no username attached to it.

Administrative users 248 might also desire to upload new code through the web interface. For instance, an administrative user 248 might upload a new or modified plug-in to their content management system for instance. While such behavior is common, it also creates a vulnerability in that the plug-in might or might not meet good design/programming standards and could have been generated by a malicious users 106. Thus, the stack 200 can ignore files (here, the plug-in) which are owned by particular UIDs and/or only allow execution of files which have no associated UID attached to it within the executive jails 122. Embodiments, do allow stacks 200 to select whether such features are employed and across which jails 122 and 124 as might be desired.

The foregoing features allow such administrative users 248 to maintain, configure, etc. their administrative user applications 240, application databases 125, hosted web sites 235, etc. despite the features of the stack 200 related to security as disclosed further herein. These administrative users 248 generally want to control the hosted web sites 235 and/or user application 140 to provide content and/or functionality to some Internet 102 or WAN audience, client base, group of followers, etc. More specifically, administrative users 249 often want to upload pictures, movies, and other content. They might also want to moderate comments or take other actions with respect to their offerings. These types of administrative users 248 differ from the host administrative user 129 who watches the host 112, performs operating system patch management, and so on. The hosted web site 235 and/or user application 140 administrative users 248 typically reside on the Internet 102 or some WAN and do desire some write privileges to their application databases, users applications 140, hosted web sites 235, etc.

In the meantime, users on the Internet 102 who (by way of a compromise of the web application 235) have somehow gained access to the host 112 are not allowed to write to the system disk in embodiments. Furthermore (as noted elsewhere herein), even if they could do so, no files within the applicable executive jails 122 are owned by any UIDs within the password file of the executive jails 122. As a result, even if a malicious user 106 found that they had gained read/write access in an executive jail 122, that malicious user 106 would still be prevented from overwriting an executing web server 235 files because of their lack of file ownership and lack of write privileges (even while acting as a valid non administrative user 104).

Furthermore, stack 200 mounts the system binaries for both the administrative jails 124 and the executive jails 122 as read-only and in their virtual roots 224 and/or partitions. As a result, even an administrative user 248 operating in their administrative jail 124 (with privileged access there in) could not inadvertently or purposefully modify system binaries other than those copies related to the administrative version of their own user application 240 in their administrative jail 124. More specifically, even administrative users 124 cannot modify copies of system binaries in other jails 122 and 124 much less those associated with the parent operating system 212. However, users with appropriate administrative privileges (administrative users 248) to the administrative jails 124 (or, rather, particular files therein) can own and therefore edit files within their administrative jails 124. The foregoing features allow administrative users 248 to maintain their application databases 125, user applications 140, hosted web sites 235, etc. without risking the security of the parent operating system 212 by allowing malicious users 106 opportunity to insert a rootkit (using for instance a kernel module, compromised library, etc.) to create a backdoor.

Executive Jails

With continuing reference to FIG. 2, various features of the executive jails 122 and administrative jails 124 are further disclosed at this juncture. Take, for instance, executive jails 122 of some embodiments. For one thing, the cross mounted and executable user applications 242 in the executive jails 122 appear to non administrative users 104 outside of the stack 200 as the hosted web site 235 (or other resource) which they believe that they are accessing. The foregoing statement implies, and, in some embodiments, it is true, that this appearance is misleading.

Nonetheless, even access to the cross mounted and executable user applications 242 can be password protected for valid non administrative users 104. As disclosed elsewhere herein, each executive jail 122 is also located in a virtual root from the other executive jails 122 (and other aspects of the parent operating system 212). Moreover, each individual executive jail 122, and the group of them as a whole, is located in virtual roots separate from those of the administrative jails 124.

Moreover, while access to the underlying tables in the application database 125 (for a given administrative version of a user application 240 in a given administrative jail 124) can be controlled via logic in the administrative user application 240, the stack 200 of embodiments, can improve on such security features. For instance, because the administrative version of the user configuration files 237 in the administrative jails 124 can differ from the executive user configuration file 238 in the executive jails 122, differing access privileges can be supplied to non administrative users 104 and administrative users 248 in those jails 122 and 124 depending on which jail 122 or 124 they operate from within. For instance, one user logged in to an executive jail 122 could have read-only access to the application database 125 while that same user (logged in as an administrative user 248) could have read/write privileges to the application database 125 from within the corresponding administrative jail 124.

Executive jails 122 (as well as the administrative jails 124) of some embodiments can be compared to lightweight virtual machines (VMs). For the functionality the jails 122 and 124 do provide, they often rely on a relatively small subset of the underlying binary files of the parent operating system 212. As a result, these binaries can be stored in the jails 122 and 124 with little overhead attaching to their execution. In addition, stacks 200 of embodiments provisions these executive jails 122 with just those resources reasonably associated with the functions which they are likely to perform within the stack 200 (notably, executing the cross mounted and executable user applications 242) of the administrative user applications 240. Meanwhile, the administrative jails 124 can provide functionality for maintaining the administrative user applications 240.

More specifically, unless provided for otherwise, users operating within the executive jails 122 have read only access to the executive jails 122 and its resources. Of course, as disclosed elsewhere herein, the stack 200 of embodiments does allow access to the application database(s) 125 via the versions of user applications 240 and 242 executing in the jails 122 and 124. Moreover, even that access can be limited at the firewall level and by the database jails 225 (using the configuration information in the differing versions of the user configuration files 237 and 238) and/or the IP addresses from which access thereto is sought.

Thus, the stack 200 can provide access to the application databases 125 at a user-by-user level of granularity while protecting the parent operating system 212 and its binaries and parent file structure 214 from unauthorized disk write operations. Indeed, no disk write privileges are associated with the executive jails 122 (or users or cross mounted and executable user applications 242 therein). Conventional stacks cannot grant such user-by-user read/write access to the application databases 125 (and the executable user applications 242) without exposing the parent operating system 212 to threats from malicious user 106 and threats from user applications 140 not meeting good design/programming practices.

Furthermore, the stack 200 grants neither the executive jails 122 nor any entity therein any outbound egress over the interface to the Internet 102. In part, this denies malicious users 106 the opportunity to get a malicious command (which relies on some external file for instance, those used during a PHP RFI attack) running in an executive jail 122 and that fetches dangerous programs or code from the Internet 102 or elsewhere. Nor does the stack 200 allow access to the parent file structure 214 by the executive jails 122 or entities associated therewith. Each executive jail 122 also contains executive user configuration files 238 cross mounted from the corresponding administrative user configuration files 237 (which are mounted in the administrative jail 124). Similarly, each executive jail contains therein the cross mounted and executable user applications 242.

With continuing reference to FIG. 2, for users without valid passwords (i.e., the public), stacks 200 limit their access to reaching the web server (or host 112) ports and/or whatever services might be running and exposed at those locations. That is, in some embodiments, public users can view information provided by the cross mounted and executable user applications 242 and/or hosted web sites 235 but cannot otherwise interact with them or anything else in the executive jails 122 (except for those objects within the execution permissions associated with the executable user applications 242).

The stack 200 of embodiments therefore denies public users the permission to do more than merely browse through hosted web sites 235 and/or other information available in the executive jails 122. More specifically, the stack 200 does not allow public users write privileges of any sort (including writes to application databases 125 and disk writes). This is not to say that the stack 200 prevents user applications 140 from allowing even public users to access the application databases 125. Rather, the user applications can do so by, for instance, allowing a public user to post a comment to a blog article. But, that sort of access can be managed by the user application 140. Thus public users cannot edit any information to which they might gain access unless allowed by the user application 140 or the permissions associated with the application database 125. This applies not only to Internet 102 users but also to local users who are operating within the context of the executive jails 122. In this manner, even if a user compromised an executive jail 122 they still could not write to disk or the application database 125 except as otherwise permitted by the user application 140 and/or application database 125.

However, valid non administrative users 104 can access the executive jails 122 and cross mounted and executable user applications 242 for which they have been granted access rights. Of course, they still have no authority to write to the parent operating system 212, the area of disk in which it might be stored (for instance, a series of locations in a redundant array of independent disks), its binaries, its parent file structure 214, etc. Indeed, they (and the executive jails 122 themselves) can see neither the parent operating system 212 nor the corresponding administrative jails 124 (or any other administrative jail 124 or executive jail 122). That is, the stack 200 hides the parent operating system 212 and the administrative jails 124 from each of the executive jails 122. Of course, exceptions can be made such as anything that is intentionally cross mounted into the executive jails 122 1) from the administrative jails 124 (by the administrative users 248) or 2) from the parent operating system 212 (by a host administrative user 129). Nonetheless, some stacks 200 allow such access to the mounted executable user applications 242 and/or hosted web sites 235 in the executive jails 122 for which non administrative users 104 have access via protocols such as, but not limited to, HTTP/S.

Administrative Jails

Stacks 200 of embodiments also define how the various administrative jails 124 behave. While the cross mounted and executable user applications 242 in the executive jails 122 can appear to be the hosted web sites 235 for the public, the administrative user applications 240 within the administrative jails 124 appear to be the hosted web sites 235 to the corresponding administrative users 248 as far as the performance of their administrative functions is concerned. As noted, these administrative jails 124 are located in separate virtual directories from each other, the executive jails 122, and other areas of the parent operating system 212 and therefore users 104 and 248 operating in one jail 122 or 124 cannot access other jails 122 or 124.

The administrative jails 124 can also resemble lightweight VMs in that the stack 200 of the current embodiment provisions them with only the resources likely to be associated with their functionality within the stack 200 (via a copy of some minimum set of binaries of the underlying parent operating system 212). As such, administrative jails 124 of some embodiments do allow both read and write privileges to users authorized as administrative users 248 with respect to the administrative versions of their user applications 240 and application databases 125. But these privileges are rather limited in scope. More specifically, the read/write privileges granted to these administrative jails 124 and administrative users 248 relate only to the mounted administrative user applications 240, application databases 125, and/or hosted web sites 235. In other words, administrative jails 124 and the corresponding administrative users 248 enjoy no access to the parent operating system 212 or its components (for instance the parent file structure 214). In many embodiments, the parent operating system 212 is hidden from the administrative jails 124 and any mounted executable user applications 242, administrative users 248, etc. therein or otherwise associated therewith. Thus, administrative users 248 cannot update modify, etc. parent operating system 212 binaries despite their administrative privileges within the administrative jails 124.

As to their contents, administrative jails 124 contain the administrative user configuration files 237 corresponding to their administrative users 248. The administrative jails 124 also include the administrative versions of the user applications 240. Thus, administrative users 104 of hosted web sites 235 might log-in in to their administrative jails 124 and use WordPress®, Microsoft FrontPage®, NetObjects Fusion®, or other site authoring tools to edit their hosted web sites 235 and/or similar tools for editing administrative user applications 240 and/or application databases 125. In addition, or in the alternative, administrative users 248 could log in using various shopping carts, content management systems, etc. such as Joomla!®, OSCommerce®, Drupal®, Zen Cart®, etc. to manipulate their hosted web sites 235. No matter the form of access used, the administrative users 248 typically log into their administrative jails 124 to use their write access privileges in accordance with the permissions granted by the administrative user configuration files 237.

However, once administrative users 248 cross mount the executable user applications 242 to the corresponding executive jails 122 and a non administrative user 104 accesses these cross mounted and executable user applications 242, the non administrative user 104 might attempt to perform some operation involving a write operation to the cross mounted and executable user applications 242 (or rather the administrative versions of the user application 240 itself). Thus, in some embodiments, the cross mounting of the administrative user applications 240 to the executive jail 122 from the administrative jail 124 occurs via a hardened Apache/PHP scripting implementation. Of course, the scope of the current disclosure is not limited to Apache/PHP web servers/programming languages. Rather, it can be extended to approaches using Nginx™, Tomcat, Java® 2 Platform, Enterprise Edition (J2EE®), Perl, Java®, Python®, ASP.NET, etc. Even so, by "hardened" it is meant that these hardened implementations of some embodiments do not allow outbound Internet 102 access or disk write capabilities via these implementations. Instead, only administrative users 248 in their administrative jails 124 have full access to their administrative user applications 240 and their administrative user applications 240 alone. Moreover, even that access is limited and does not extend to write-to-disk access and/or to system binary modifications other than those copies residing in the administrative jails 124.

In some embodiments, stack 200 also by default can include certain HTTP headers which can improve security. For instance, stacks 200 of embodiments can include HTTP headers such as:

X-Frame-Options: SAMEORIGIN

This header (which is supported by most browsers) prevents users other than the administrative user 248 for a hosted web site 235 from framing that web site. Accordingly, this header reduces click jacking.

X-XSS-Protection: 1; mode=block

While this header currently only appears to work in Internet Explorer, putting it in block mode or otherwise disabling it can prevent it from introducing vulnerabilities related to reflected cross site scripting (XSS) on the hosted websites 235.

Strict-Transport-Security: max-age=15768000

Strict-Transport-Security (STS) helps ensure that hosted web sites 235 will be HTTPS and therefore helps protect against man in the middle 116 attacks.

X-Content-Security-Policy: allow 'self'; img-src 'self' data; options inline-script eval-script;

This experimental CSP header built into makes it harder for malicious users 106 to inject malicious content into hosted web sites 235 thereby also helping prevent XSS attacks.

Thus, full apparent functionality of the executable user application 242 can be provided to a non administrative user 104 (as intended by the administrative user 248) operating within the executive jail 122 while controlling disk access. These actions can also be accomplished while prohibiting user activities that might be malicious or unusual with regard to the administrative user application 240 itself and/or the parent operating system 212.

Indeed, so that authorized administrative users 248 can edit, reconfigure, etc. the administrative versions of the user applications 240, the administrative jails 124 of some embodiments do face the Internet 102 through applicable access techniques (for instance, VPN). More specifically, administrative users 248 can access their administrative jails 124 (and the administrative user applications 240 therein) through various secure protocols available now and/or yet to be developed such as combinations of SSH-HTTPS, VPN techniques, etc. Such access can be password protected and/or encrypted. Moreover, Internet 102 access to/from the administrative jails 124 can be further restricted by various embodiments. For instance, the stack 200 can prohibit/prevent inbound Internet 102 traffic except for that traffic associated with authorized administrative users 248 (and/or the host administrative user 129 via the separate administrative network 142). Outbound Internet 102 access for these parties could, though, be allowed if desired.

Database Jails

As noted elsewhere herein, embodiments provide database jails 225 and/or virtual roots in which the application databases 125 can be located. While FIG. 2 illustrates a one-to-one correspondence between the database jails 225 and the application databases 125, no such limitation exists with respect to the current disclosure. The stack 200 allows administrative users 248 to structure their user applications 140 and application databases 125 according to their desires. In many embodiments, the database jails 225 operate in a manner similar to administrative jails 124 but without having a corresponding executive jail 122. Entities in both the executive jails 122 and the administrative jails 124 (and entities therein) often have legitimate desires to access the application databases 125 residing in the database jails 225. For instance, non administrative users 104 might want to send sensitive data to the application databases 125 pertaining to an account that they might have on a hosted web site 235. Likewise, an administrative user 248 might need to alter the table structure of their application database 125.

Figure 6:
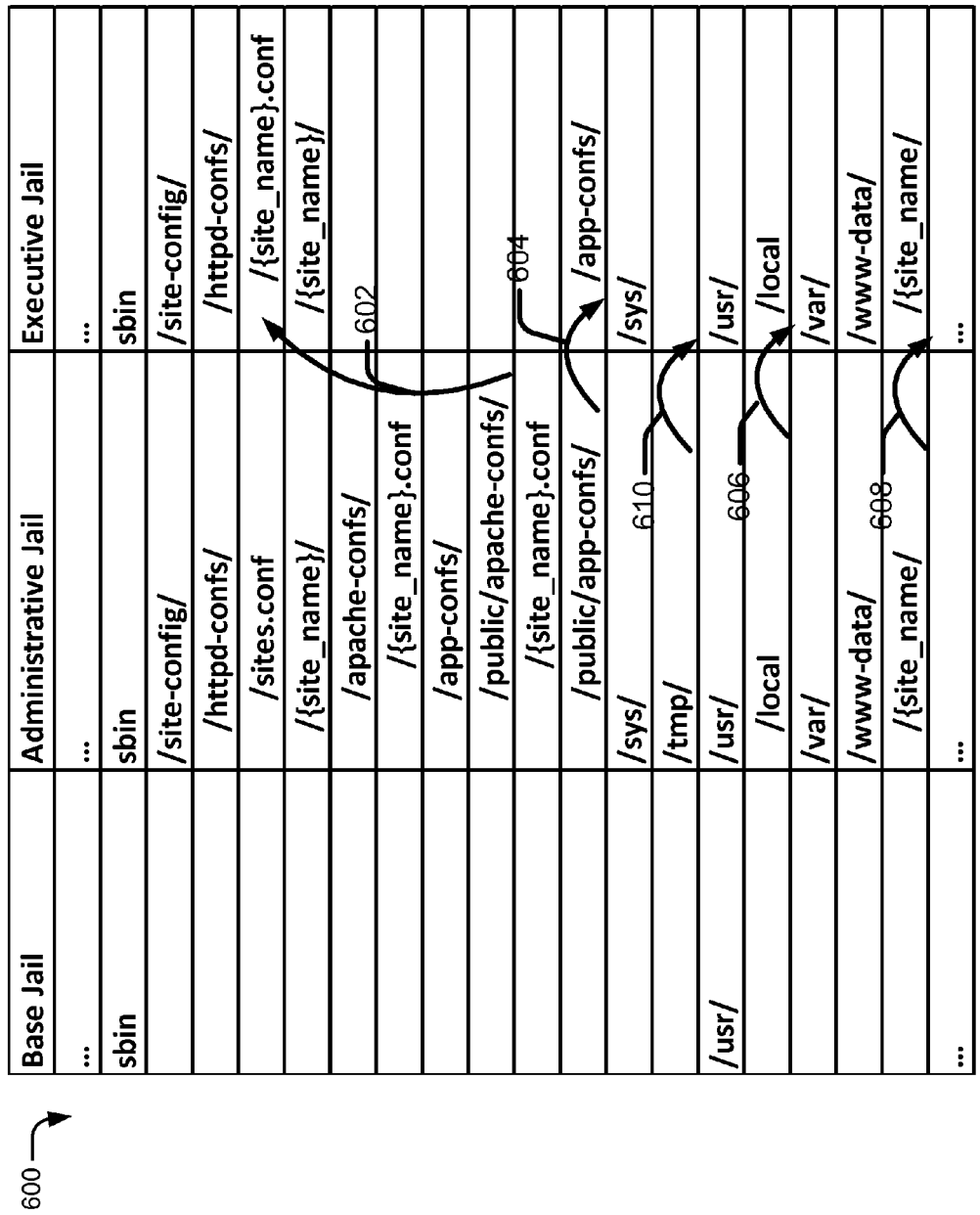
FIG. 6 illustrates cross mounted configuration files.

Thus, the application configuration file 236 (for instance "app-confs" as illustrated in FIG. 6) can define username:password pairs for the various valid users 104 and 248 for access to the application databases 125 in the database jails 225. Since the database jails 225 can detect the IP addresses (IP1 and/or IP2) from which access requests originate, it can disallow access requests from administrative users 248 from within the executive jails 122 whose write privileges to the application databases 125 belongs with the administrative jails 124 not the executive jails 122. As a result, malicious users 106 trying to brute force an administrative password for an application database 125 from the executive jails 122 will fail even if they do correctly guess the username:password pair of an administrative user 248. On the other hand, database jails 225 of some embodiments imposes no restriction on access attempts from valid administrative users 248 from within their administrative jails 124 although an administrative jail 124/address 1P2 mismatch could cause a database jail 225 to deny an access attempt of any sort from a particular administrative user 248 in a particular administrative jail 124. Moreover, such an event could trigger a reaction from the stack 200 such as notifying a compliance officer, the host administrative user 128, and/or security operations personnel.

Jails 122, 124, and 225 can be implemented in stacks 200 as templates for a variety uses. For instance, while the foregoing has discussed executive, administrative, and database jails 122, 124, and 225 other jails such as (syslog) logging jails can be implemented by stacks 200. Moreover, the various jails can exist within one (real or virtual) machine or on a plurality of separate devices with switches, firewalls, etc. deployed there between if desired. As a result, modular stacks 200 can be deployed and connected together to tailor systems as users might desire with the jails 122, 124, 225, etc and permissions, privileges, rights, etc. securing the content therein.

Users and User Configuration Files

How various users interact with the configuration files might merit some discussion at this juncture. Thus, the host administrative user 129 is capable of editing the parent file structure 214 and the data, data structures, virtual roots, partitions, etc. defined therein. This means, in part, that the host administrative user 129 can edit the executive jails 122, the administrative jails 124, the corresponding relationships there between, the administrative user applications 240, etc. Moreover, the host administrative user 129 can edit the configuration files 236 to 238 associated with both non administrative users 104 and administrative users 248 as well as the administrative versions of the user applications 240. In other words, host administrative users 129 can have complete unrestricted access to the stack 200 via the administrative network 142 and needs no user configuration file with which to operate. Instead, the access of the host administrative user 129 comes via the administrative network 142 over which the host administrative users 129 has sole access.

In contrast, application and user configuration files 236-238 limit the activities of users 104 and 248. The user configuration files 237 and 238 provide for resourcing the corresponding users 248 and 104 and define the activities in which they are permitted to engage. Application configuration files 236 typically contain application or web server specific configuration information and therefore determine how an administrative version of a user application 240 behaves in an administrative jail 124. The application configuration file 236 also helps define how the hosted web sites 235 and/or administrative user applications 240 interact with their associated application databases 125.

The user configuration files 237 and 238 can also contain nonces that are unique to each file thereby complicating attempts to mis-use these user configuration files 237 and 238. Thus, even if these files are compromised they do not allow a malicious user 106 (operating from the corresponding jail 122/124) to know the value of these nonces (in the differing versions of the configuration files 238/237 in the other jail 124/122). Moreover, no user configuration file 237 and/or 238 allows or is even permitted to allow non administrative users 104 or administrative users 248 access to the parent operating system 212.

That means, in part, that the administrative versions of the user configuration files 237 can grant read/write privileges to the administrative users 248 from within their administrative jails 124 but not elsewhere. Thus, and because even administrative users 248 cannot see the parent operating system 212, the only files in the parent operating system 212 (or the parent file structure 214 for that matter) that administrative users 248 can edit are their own administrative versions of their user applications 240, their web servers, and the programming language(s) that their web servers might use (for instance, PHP, Python®, Perl, Java®, ASP.NET, etc.). But, even so, the stack 200 prevents administrative users 248 from modifying binaries of the parent operating system 212 itself. Note, also that it is only the administrative versions of the user configuration files 237 which define administrative privileges for the administrative users 248.

Moreover, these administrative user configuration files 237 relate to the administrative users 248 do not get mounted to the executive jails 122 unless provided for by the host administrative user 129. Thus, the administrative versions of the user configuration files 237 are not vulnerable to attack by malicious users 106 operating in the executive jails 122 (or by user applications 140 which are not written to good design/programming practices and/or that might be behaving in some potentially errant manner).

As to the non administrative users 104 illustrated by FIG. 2, the cross mounted and executive user configuration files 238 define privileges for these users. For instance, merely public users (those without valid passwords for a particular executive jail 122) can at most only read/view the information in the executive jails 122 since they have no cross mounted executive user configuration file 238 associated therewith. Non administrative users 104 who do have valid passwords can be given read access to the executable user applications 242. This privilege means that they can use the executable user applications 242 (and the functionality provided thereby) but cannot alter the executive user applications 242 much less the un-cross mounted and hidden administrative versions of the user applications 240.

In other words, if an un-privilege and non administrative user 104 accesses a hosted web site 235, it will ordinarily appear to have full access to the application database 125 functionality if the user application 140 permits it. Of course, administrative functions (even within the administrative jails 124) are restricted by embodiments to prevent even administrative users 248 from writing to system disk. Moreover, non administrative users 104 have no file ownership privileges anywhere in the stack 200 of many embodiments. In addition, it might also be worth noting that the cross mounted and executive user configuration files 238 point to different storage locations within the parent operating system 212 than the corresponding administrative user configuration files 237 in the administrative jails 124. And, again, no non administrative user 104 has the power to edit their own configuration files 237 or 238.

These non administrative users 104 (and administrative users 248) are therefore powerless to edit the parent operating system 212 or any portion thereof. Plus, since non administrative users 104 can only see and access the executive jails 122 and the contents thereof, rogue behavior on their part can, at worst, alter the executive and cross mounted user applications 242 and those executive user configuration files 238 that are also cross mounted in to the executive jails 122 in which they happen to be. But, they cannot alter the corresponding administrative configuration files 236 and 237 related to the administrative users 248 and the administrative versions of the user applications 240 in the administrative jails 124. Thus, administrative versions of the user applications 240 and configuration files 236 and 237 remain safely hidden in the administrative jails 124 from non administrative users 104 and malicious users 106.

Cross Mounting of Configuration Files

With ongoing reference to FIG. 2, some additional disclosure related to the executive user configuration files 238 cross mounted in to the executive jails 122 might be useful at this juncture. On that note, all administrative user configuration files 237 associated with non administrative users 104 can be cross mounted to the corresponding executive jails 122 by the administrative users 248 by their decisions regarding which files/information which they desire to have in the administrative configuration files 237 which are then cross mounted. Similar information pertaining to the administrative users 248 is not permitted to be cross mounted by the stack 200 according to embodiments. These executive user configuration files 238 allows the executive jail 122 to verify non administrative users' 104 identities thereby further safeguarding other jails and/or virtual roots of the parent operating system 212 from rogue behavior. Moreover, since the cross mounting of the executive user configuration files 238 occurs on a executive jail 122 by executive jail 122 basis (or hosted web site 235 by hosted web site 235), the password files associated with each executive jail 122 (or hosted web site 235) are independent from each other and can have at least some identical UID:password pairs therein.

Again, in embodiments, all cross mounted and executive user configuration files 238 are permitted only disk read only privileges (and access privileges to application database 125 via user applications 140) associated therewith. As a result, any disk write privilege appearing in a mounted and executive version of the user configuration file 238 would be a likely indication of rogue behavior: something altered that executive user configuration file 238. Moreover, the foregoing privilege restrictions ensure that no non administrative user 104 can write directly to any location within the parent operating system 212 without triggering suspicion.

Instead, any disk writing activity that non administrative users 104 might attempt from the executive jails 122 would have to occur via cooperation with the executable user application 242 and the administrative version of the user application 240 and could only affect the associated application database 125. Again, the executive and administrative versions of the user configuration files 238 and 237, respectively, point to different storage locations in the parent operating system 212 and allow write privileges to no one other than administrative users 248. Those privileges, moreover, extend only to the administrative jails 124, their binaries, administrative versions of the user applications 240, associated application databases 125, etc. Successful rogue behavior defeating the safeguards associated with all of the foregoing layers of protection would therefore seem hard to image. Indeed, stacks 200 of the current embodiment include one or more backups to most, if not all, security features employed therein. These backups force malicious users 106 to find two or more simultaneous weaknesses to exploit (without being detecting) thereby making successful attacks exponentially more difficult than single-weakness-based exploits such as those to which conventional hosts 110 remain vulnerable.

With further reference to FIG. 2 and the cross mounting of the user configuration files 236 to 238, a more specific example illustrates an implementation of the cross mounting techniques employed by various stacks 200. In the current embodiment, the administrative version of the configuration files 236 and 237 are cross mounted using different names in the executive jails 122 than the names of the corresponding files 236 and 237 in the administrative jails 124. More specifically, suppose that a directory named /site-config/ exists in an administrative jail 124 and its corresponding executive jail 122. Further suppose that the administrative version of this directory /site-config/ further defines a series of directories called {site_name}/app-config/public/. Instead of merely cross mounting {site_name}/app-config/public/ as named in that manner, stacks 200 cross mount these directories into the executive jail 122 using a name such as /site-config/{site_name}/app-config/. From the perspective of each executive jail 122 users therein would see /site-config/{site_name}/app-config/. However, in the administrative jails 124 stacks 200 differentiate between the two versions. One way of doing so is to append "public" to the administrative directory name so that the administrative users 248 know which files (or information) to put in each directory yet the user application 140 can point to the same location on disc: /site-config/{site_name}/app-config/public/place_holder.php will me mounted as /site-config/{site_name}/app-config/place_holder.php in the executive jail 124. In this situation, from the perspective of each jail 122 and 124 place_holder.php exists and can provide different application features, such as different database usernames and passwords so long as place_holder.php is changed according to the jail from which it will be read. Thus a malicious users 106 who manages to compromise the executive jail 122 will at best find what has been mounted from /site-config/{site_name}/app-config/public/ directories (and its contents) but will not see what the administrative jail contains in /site-config/{site_name}/app-config/ even though from the executive jail the file path appears to be /site-config/{site_name}/app-config/. That is, users will not see files associated with the parent version of that directory. Instead, they will only see the version of that directory in the executive jail 122.

But, the compromise stops there and in that executive jail 122. While, a malicious user 106 might realize that they are in a jail (and maybe even that other jails exist), the malicious user 106 is unable to guess at what else might be there and, indeed, remains clueless which other hosted web sites 235, user applications 140, files, etc. might reside on the same disk (whether virtual or real). Of course, the particular file and directory names can change without affecting the scope of the disclosure. Moreover, the cross mounting of Apache-based configuration files can account for Apache's lack of facilities for handling the glob * operators in file paths (as opposed to its abilities to handle these operators in file names). In any case, such implementations prevent information leakage from the path names regarding other hosted web sites 235 that might reside in the host 112. This feature therefore prevents malicious users 106 from pivoting to attack these other hosted web sites 235. FIG. 6 provides yet another cross mounting implementation.

FIG. 6 illustrates cross mounted configuration files. More particularly, FIG. 6 illustrates an Apache implementation regarding the cross mounting of configuration files 236 to 238. Moreover, FIG. 6 illustrates one Apache implementation which works around the lack of pathname-related glob * operator resources in Apache and which still allows the administrative jail 124 and executive jail 122 to possess their own copies of the configuration files (without requiring separate httpd.conf files in these jails 122 and 124). Moreover, the foregoing features allow stacks 200 to keep separate secure socket layer/transport layer security (SSL/TLS) certificates. So even if a malicious user 106 is able to steal an SSL/TLS certificate from one executive jail 122 they will not be able to execute man in the middle 116 attacks on traffic to/from another jail 122 and/or 124 if these other jails use separate certificates. Such features limit the potential exposure to just one jail should a malicious user succeed in such scenarios. Additionally, as FIG. 6 illustrates, the files in the base jail (from which the administrative jail 124 and its corresponding executive jail 122 depend) are mounted to the administrative jail 124 as is in embodiments. This mounting arrangement therefore provides administrative users 248 operating within their administrative jail 124 access to all files pertinent to their administrative duties.

However, a subset of the configuration files are cross mounted to the executive jail 122. Indeed Arrows 602, 604, 606, and 608 illustrate the partial cross mounting of some directories whereas arrow 610 indicates that one particular directory (here the tmp directory) does not get cross mounted into the executive jail 122. Any directory containing sensitive information can be withheld from the cross mounting by administrative users 248 who segregate such directories from the directories which will be cross mounted or by some scheme in stacks 200 to so designate such directories. With continuing reference to FIG. 6, in the executive jail 122 the file paths for other hosted web sites 235 do not appear anywhere (in the configuration files themselves or on disk) from the perspective of the executive jail 122 and those operating therein. In this manner, malicious users 106 cannot gain information that might have otherwise been leaked from the files, pathnames, etc. Again, these features help prevent a malicious user 106 from pivoting from one compromised web site 235 to attack another.

Secure Execution of User Applications and Web Sites

Thus, the stack 200 of various embodiments allows user applications 140 and hosted web sites 235 to be designed, developed, written, etc. without security in mind. Indeed, these user applications 140 can contain just about any type of content, functionality, etc. without being a danger to other user applications 140 or the parent operating system 212. Moreover, the user applications 140 can fail to meet good design/programming practices (at least from a security perspective) and be inherently susceptible to attack when executed by conventional hosts 110, yet they can still execute securely within stacks 200 of embodiments.

More specifically, the user applications 140 themselves need not necessarily support various security technologies such as VPN, HTTP/S, SSH, etc. to enjoy the benefits thereof although application owners might desire to use such techniques to help foil man in the middle 116 attacks/vulnerabilities (for instance, intercepting sensitive information being transferred to/from the non administrative users 104). Although, the user applications 140 might execute more reliably of they do support such technologies. Furthermore, pre-existing user applications 140 need not be re-written or otherwise edited to be executed within the executive jails 122 since they can rely on the security features of stacks 200 to protect parts of the parent operating system 212 (and other hosted user applications 140) from their potentially errant behavior. For instance, the stacks 200 can require that non administrative users 104 access the (cross mounted versions) of the executable applications 242 via the HTTP/S protocol (or some other protocol) associated with certain executive jails 122.

As with the administrative user configuration files 237 (for valid non administrative users 104), the executable user applications 242 are cross mounted to the executive jails 122 from the administrative jails 124. Thus, rogue behavior in the executive jails 122 can only harm the cross mounted and executable user applications 242, not the corresponding administrative versions of the user applications 240 in the administrative jails 124. Again, these two versions of the user applications 240 and 242 are stored in different virtual roots which are separated from each other by the parent operating system 212.

More on HIPAA, GLBA, Sarbanes-Oxley, PCI DSS Compliance Auditing

With reference again to FIG. 2, the stack 200 of embodiments also provides compliance/auditing features sometimes desired by users affected by HIPAA, GLBA, Sarbanes-Oxley, PCI DSS, etc. rules. The stack 200 gives administrative users 248 (and host administrative users 129 for that matter) freedom to implement user applications 140 that watch for potential violations of the regulations, standards, industry practices, etc. with which they might want to comply (and changes thereto). For instance, via syslog data 130 monitoring, these report-generating user applications 140 can detect intentional (or unintentional) changes in read/write privileges and send an alert informing a compliance officer (or other user) that a hosted web site 235 has detected a suspected attack and has responded in some fashion to restore compliance (should the attack or accidental occurrence such as an administrative mis-configuration have affected it). Moreover, because malicious users 106 cannot alter the underlying syslog data 130 after-the-fact, the stack 200 of the current embodiment can preserve all audit trails (or at least allow for their recovery) for further investigation. Stacks 200 thereby provide better post-forensic analysis as well.

In some embodiments, the stack 200 uses syslog monitoring capabilities including those related to security issues as well as those related to web logging. Of course, in the alternative or in addition, stacks 200 of embodiments can use other monitoring capabilities in place of syslog capabilities.

Whether the stack 200 uses syslog capabilities or some other monitoring capabilities, the stack 200 can gather syslog data 130 (or similar information) from where ever it might arise in the system 100. For instance, FIG. 2 illustrates syslog data 130 being gathered from virtual roots 224 and/or partition for the executive and administrative jails 122 and 124 respectively; from the parent operating system 212; from the parent file structure 214; and from the hosted web sites 235. Thus, if it appears (from a comparison of the syslog data 130 and the intended/expected features, aspects, etc. of the stack 200) that something unusual, un-authorized, or malicious might be occurring (or occurred), the stack 200 can take various actions. For instance, the stack 200 can stop the activity; revert to a last-known-safe-state; roll the activity back; allow it to continue while gathering intelligence about it; alert the host administrative user 129; respond according to a rule or set of rules; etc.

In any case, stacks 200 of embodiments send syslog data 130 to the parent operating system 212 (and/or to off-site secure storage) for storage and subsequent processing. Some stacks 200 also (or instead) store syslog data 130 in the corresponding administrative jails 124 corresponding to the location of the activity that triggered the syslog reporting mechanism(s). In any case, the syslog data 130 is secured for subsequent review and analysis by either the host administrative user 129 and/or the administrative users 248 as the case may be. Furthermore, some embodiments forensically secure the syslog data 130 stored in the parent operating system 212 (and, perhaps, within a syslog dedicated partition if desired to, for instance, manage its size and prevent server denials of service should it become large enough to cause such effects). One of many secure mechanisms for sending syslog data 130 to the parent file structure 214 is the open source security (OSSEC) protocol.

Parent operating systems 212 of embodiments also monitor for other pertinent data indicative of malicious, negligent, potentially errant, etc. behavior including (but not limited to): file modifications; permission changes; ownership changes; uptime/performance monitoring (of both executive and administrative jails 122 and 124, web applications, user applications 140, application databases 125, hosted web sites 235, etc.); disk input/output operations; allocated and available drive space; allocated and available memory; CPU utilization; successful and unsuccessful user login attempts; the number of TCP connections; the number of TCP states; web requests; etc. Parent operating system 212 can also monitor processes to help ensure that features such as syslog and/or the web servers remain operative. Of course, this syslog data 130 can be made available to compliance officers, compliance auditors, and/or other users in summary and/or detailed form. In any case, the stack 200 can make available a record of pertinent events for forensic analysis and/or review.

Regarding web logging, syslog data 130 related thereto can be sent to and stored in the administrative jails 124 where the corresponding administrative users 248 would likely be the ones with interest in its contents. Of course, the host administrative user 129 could also review their syslog data 130 if desired since the privileges associated with the host administrative user 129 allows the host administrative user 129 access to the administrative jails 124. In either case, the syslog 130 data can also be monitored, reviewed, and analyzed, used for corrective or remedial action, etc. by the administrative users 248 and/or host administrative user 129. Additionally, administrative user applications 240 (and their executable user application 242 counterparts) can be provided to generate reports from the syslog data 130 sufficient to at least, in part, comply with HIPAA, GLBA, Sarbanes-Oxley, PCI DSS, and/or similar rules. At this juncture it might be useful to disclose aspects of the operations of systems 100, hosts 112, stacks 200, parent operating systems 212, etc. of some embodiments.

Host Setup Methods

Figure 3:
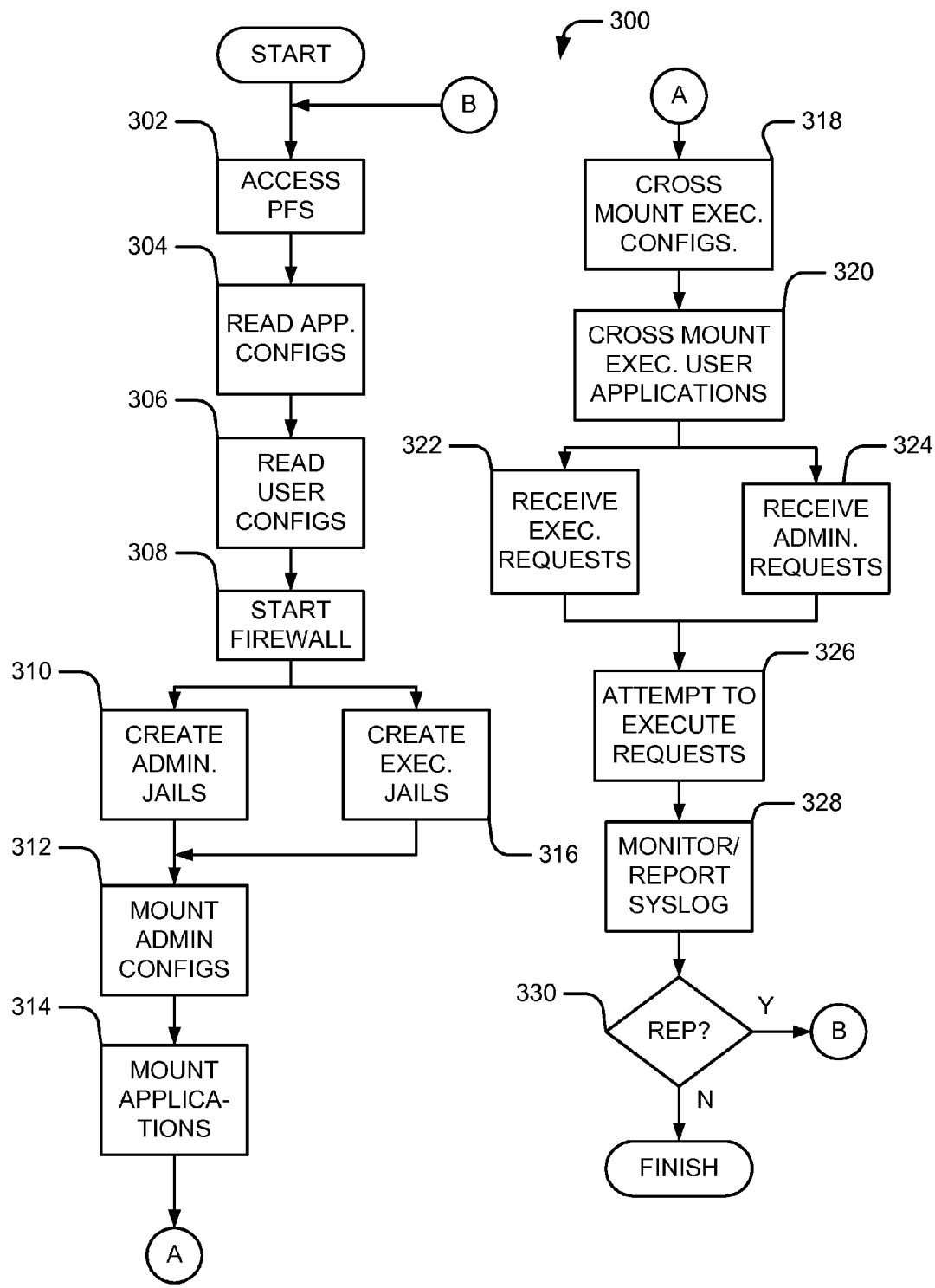
FIG. 3. Illustrates a flow chart of a method for setting up an operating system and/or web server.

FIG. 3. Illustrates a flow chart of a method for setting up an operating system and/or web server. More specifically, FIG. 3 illustrates that the method 300 sometimes begins with the parent operating system 212 booting up and/or accessing its parent file structure 214 as reference 302 indicates. It is noted here that syslog data 130 monitoring and/or firewalls might have already be activated if desired. In any case, the parent operating system 212 can read the administrative application configuration files 236 looking for unexpected changes. See reference 304.

Method 300 can also include reading the administrative and executive user configuration files 237 and 238 as indicated at reference 306. If desired, the parent operating system 212 can compare both versions of the user configuration files 237 and 238 (administrative and executive) if both are available and check for differences. An unexpected difference, of course, might indicate that at least something unusual and/or potentially worthy of investigating has occurred. In this manner (and perhaps others) the parent operating system 212 can begin identifying users 104 and 248 as they might attempt to access the host 112 (not that network services are necessarily running at this time). Again, if something unusual occurs or is detected (for instance, an unknown user attempts to access the host 112 or any user attempts a disk write operation anywhere in the host 112) an alert can be raised and/or the activity stopped whether automatically or by intervention by a host administrative user 129. Similarly, the administrative application configuration file 236 could be inspected for unexpected modifications and appropriate actions taken should a discrepancy be detected.

Furthermore, as part of method 300, the parent operating system 212 can start the network and/or host firewall 114 application before any network services are started (or if another instance of it is desired). See reference 308. Moreover, because the executive jails 122 and administrative jails 124 might both need to contact the corresponding application databases 125, provisions can be made at about this time so that they can do so. For instance, the firewall can be configured to allow VLANs associated with the jails 122 and 124 and/or the application databases 125 to contact each other through the VLAN switch 202, on certain ports, in certain manners, etc. so that the jails 122 and 124 and application databases 125 can support the functionality desired in the hosted web sites 235 and/or user applications 140.

Thus, with at least some security measures in place, the parent operating system 212 of the current embodiment can begin setting up the jails 122 and 124. Of course, the parent operating system 212 could set up the jails 122 and 124 before the aforementioned activities depending on the desires of the host administrative users 129 who might be directing the activities of the parent operating system 212. For instance, the parent operating system 212 could create one or more administrative jails 124 or virtual roots as indicated at reference 310. If the application configuration files 236 and the administrative version of the user configuration files 237 are not already mounted in the administrative jail 124 related virtual roots 224 and/or partitions the parent operating system 212 can mount these files in to the appropriate administrative jails 124. See reference 312. At some point, the parent operating system 212 could cross mount the administrative user applications 240 in to the administrative jails 124 as indicated at reference 314. The parent operating system 212 could also create virtual roots for the executive jail(s) 122 as reference 316 indicates.

Method 300, as illustrated by FIG. 3, also includes the administrative user 248 cross mounting executive user configuration files 238 (for the non administrative users 104) to one or more executive jails 122. Thus, non administrative users 104 accessing the executive jails 122 can be authenticated before they proceed with any activity therein. See reference 318. At some point, it might become desirable for the administrative user 248 to cross mount one or more of the executable user applications 242 from its administrative jail 124 in to an executive jail 122. Accordingly, reference 320 illustrates the operating system 212 cross mounting an executable user application 242 to the executive jail 122 which corresponds to the administrative jail 124 in which the administrative version had been located. Thus, if any non administrative user 104 accesses the cross mounted and executable user application 242, that non administrative user 104 can perform those activities for which for which they possess privileges in accordance with the cross mounted and executable user configuration file 238. See reference 322 where non administrative users 104 are illustrated as making access requests upon the executive jails 122.

Of course, as indicated by reference 324, administrative users 248 might begin making read/write access requests to various administrative jails 124, the binaries therein, administrative user applications 240, application databases 125, etc. If and/or when these requests occur, the administrative jails 124 can authenticate the users involved, check their privileges, and grant/deny access accordingly. See reference 326 and (and see also FIGS. 4 and 5 for further details in accordance with some embodiments).

Figure 4:
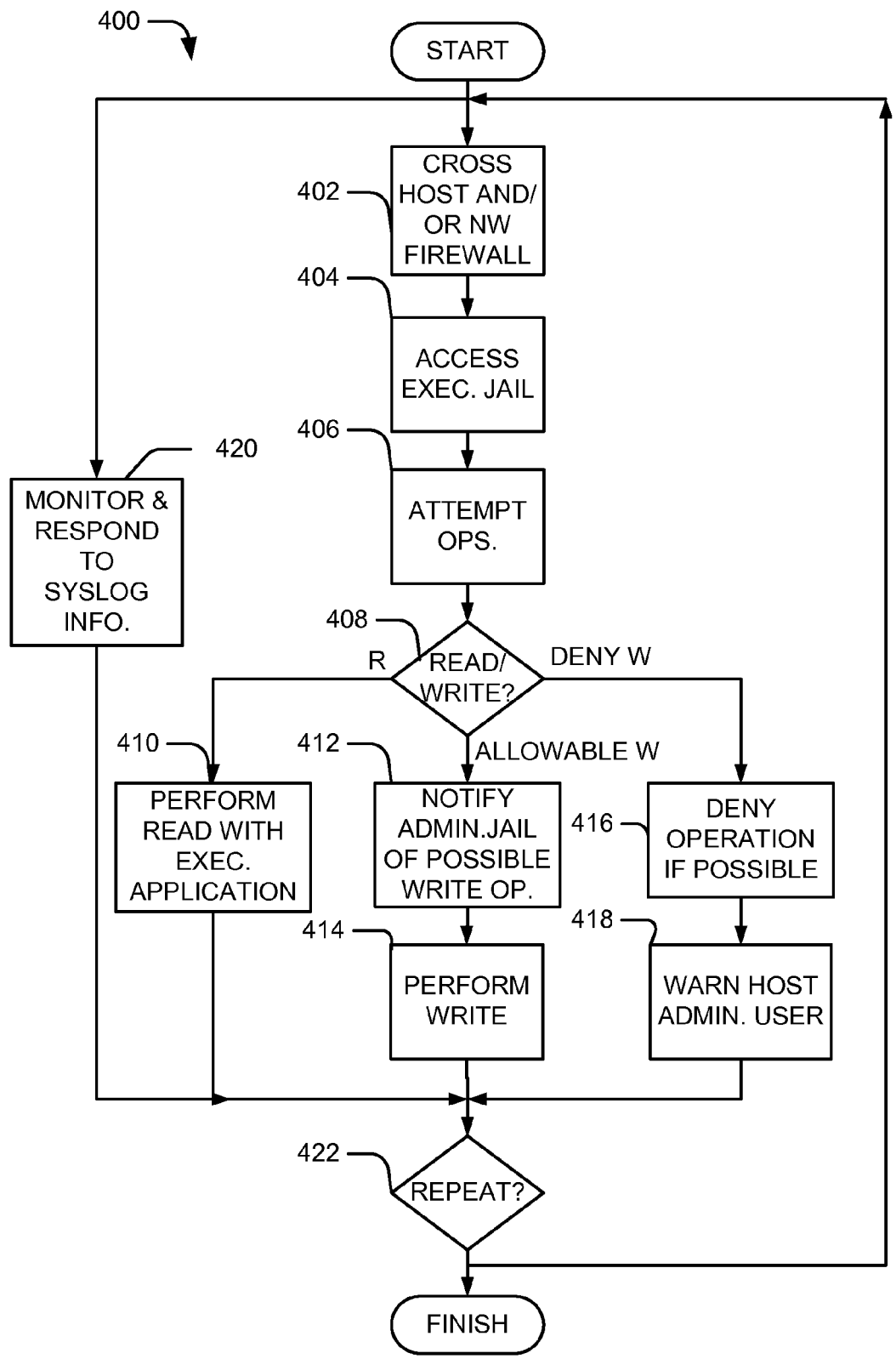
FIG. 4 illustrates a flow chart of a method associated with an executive jail.
Figure 5:
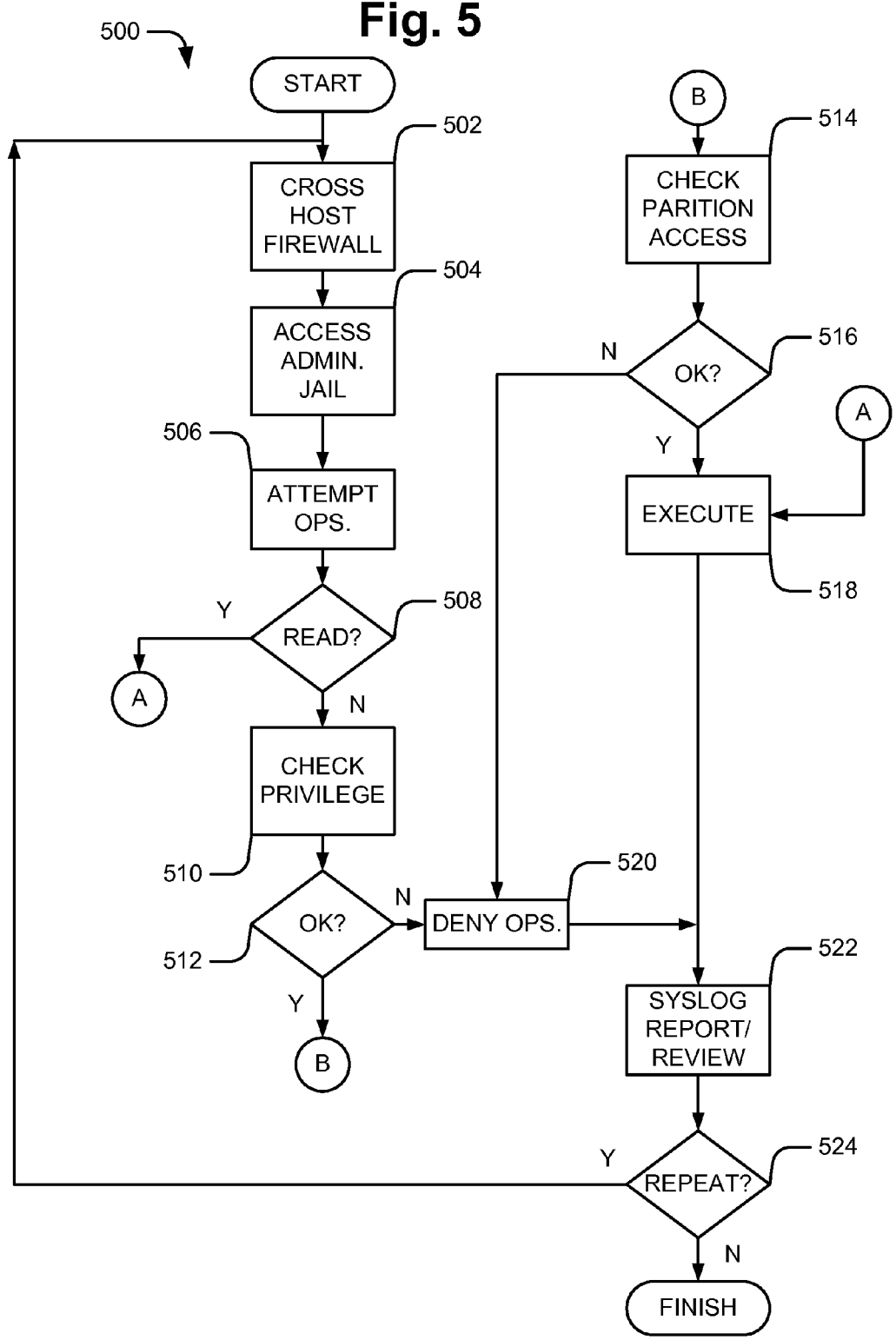
FIG. 5 illustrates a flow chart of a method associated with an administrative jail.

As disclosed further herein, the parent operating system 212 collects syslog 130 data from a variety of sources within the host 112 and perhaps even from the system 100. Depending on the embodiment, the parent operating system 212 could also collect syslog data 130 information throughout all or portions of the method 300 (and other methods such as methods 400 and 500 as illustrated by FIGS. 4 and 5 respectively). See reference 328. Of course, the collected syslog data 130 can be analyzed (and/or compared with the expected conditions and activities in the host 112) to detect, identify, prohibit, etc. unusual, un-authorized, malicious, and other types of potentially errant activity. If desired, a security event and incident management (SEIM) tool capable of aggregating disparate data can be used to aid in monitoring the syslog data 130 (and/or syslog like data) and, via it, the operation of the host 112. Appropriate reports can be generated at reference 328 (and/or at other times) if desired to satisfy compliance/auditing rules related to HIPAA, GLBA, Sarbanes-Oxley, PCI DSS, etc.

Moreover, method 300 can repeat in whole, or in part, as reference 330 indicates. Thus, the stack 200 provides for system level self auditing during methods 300, 400, 500, and at other times.

Executive Jail Methods

FIG. 4 illustrates a flow chart of a method associated with an executive jail. More specifically, FIG. 4 further illustrates that method 400 can occur in association with a user attempting to access an executive jail 122 (see for instance reference 322 of FIG. 3). From the user perspective, (who might be a public user, a valid non administrative user 104, a malicious user 106, an administrative user 248, a host administrative user 129, etc.), the user will typically first make an access request via the network and/or host firewall 114 or VLAN switch 202. At this time, the network and/or host firewall 114 and/or VLAN switch 202 can compare the request and/or information regarding the user to its rules, settings, configuration, etc. and determine whether to allow the user access to the executive jail 122 in accordance therewith. See reference 402.

If the user and/or request passed muster, the user is initially allowed read only access to the executive jail 122 via address IP1. See reference 404. The user may then begin attempting various operations as indicated by reference 406. In embodiments, all read operations within the executive jails 122 are allowed unless it is desired that even public browsing of information in the executive jail 122 be prohibited. Moreover, if the executive user application 242, the administrative user application 240, and the parent operating system 212 allows, some write operations might be permissible. But, if no such provisions have been made, any disk write operation will be denied by the executive jail 122.

Accordingly, method 400 branches at reference 408. More specifically, if a mere disk read operation (which includes operations that happen to write to off-disk locations such as those involving application databases 125) is requested, as at reference 410, the executive jail 122 allows access for that user for that request to the executable user application 242, application database 125, and/or hosted web site 235 identified by the request (in compliance with the administrative user application 240 and permissions granted by the stack 200). If the parent operating system 212 detects any disk write operations during the requested operation, appropriate actions can be taken.

If a permissible, pre-arranged, disk write operation has been requested, method 400 branches to reference 412. More specifically, the parent operating system 212 notifies the administrative jail(s) 124 corresponding to the write request that such a request has been made. If the configuration of the administrative jail(s) 124, executable user application 242, administrative user application 240, and the stack 200 involved in the apparent request all permit the request, the stack 200 can grant the request. But, if any such test fails, the stack 200 denies the request and perhaps issues an alert or takes other action. See references 412 and 414. Typically, the stack 200 will prevent branches to references 412 and 414 which perform such disk write operations. However, if a particular user application 140 requires/requests such access, permissions can be pre-arranged with the consent/cooperation of host administrative user 129 if desired.

In many embodiments, if no disk write operations of any kind are provided for in a particular executive jail 122 (which is typical), the stack 200 denies the request. Ordinarily, disk write operations will cause method 400 to branch to references 416 and 418. However, even if a supposedly non-malicious user has attempted a disk write operation in executive jail 122, something unusual would seem to be occurring. Accordingly, it is recognized that a malicious user 106 might have gained control of this particular executive jail 122 despite the safeguards associated there with. The executive jail 122 will therefore usually attempt to deny the disk write operation. See reference 416. If the write operation succeeds any way, the parent operating system 212 can stop execution of all activity associated with the particular executive jail 122 involved; freeze the configuration file 238 associated with the apparent non administrative user 104 involved; invalidate the password of that user (if that user has a valid password); alert the corresponding administrative user 248 and/or the host administrative user 129; or take other actions as might be desirable. See reference 418.

Of course, as noted elsewhere herein, syslog data 130 available at reference 328 (or available in the background)

can be made available to support such activities. Moreover, reference 420 indicates that the parent operating system 212 can be monitoring syslog 130 data during all or a portion of method 400. Accordingly, if any activities, users, conditions in system 100, etc. deviate from what is expected and/or permitted, the parent operating system 212 can take appropriate actions. Otherwise, method 400 can repeat, in whole or in part, as indicated at reference 422.

Administrative Jail Methods

FIG. 5 illustrates a flow chart of a method associated with an administrative jail. More specifically, FIG. 5 illustrates method 500 whereby some administrative users 248 can access their administrative jails 124. In many situations, method 500 begins with a user making an access request to some administrative jail 124 through the network and/or host firewall 114 and/or VLAN switch 202. As in method 400, the host firewall 114 and/or VLAN switch 202 can authenticate the user and otherwise verify that the access request (which, if granted, permits write activities within the requested administrative jail 124) was made in accordance with the configuration, rules, etc. of the host firewall 114 and/or VLAN switch 202. See reference 502. If not, the request is usually denied.

Otherwise, the host firewall 114 and/or VLAN switch 202 allows the request to precede. See reference 504. Once the apparent administrative user 248 gains access to the requested administrative jail 124 via address IP2 for instance, that user becomes free to perform various read and write operations to/from the administrative jails 124 therein, application databases 125 therein, administrative user configuration files 237 therein (except their own user configuration file 237), binaries therein, etc. But, as disclosed elsewhere herein, those operations are limited to the confines of the particular administrative jail 124 to which the user has gained access. Any attempted write activity outside of that administrative jail 124, particularly disk writes or writes to other administrative jails 124 (or even executive jails 122) by that user, will trigger appropriate action(s) from the stack 200 of many embodiments. See reference 506.

Indeed, as indicated by reference 508, the administrative jail 124 of the current embodiment will allow most read operations made by a user who gained access to an administrative jail 124 as long as those read operations pertain to that administrative jail 124 and/or comply with read-access-restrictions pertaining to other virtual roots of the parent operating system 212. But, for instance, a read request to another administrative jail 124, executive jail 122, or the parent operating system 212 (which are supposedly hidden from the administrative jail 124 involved) could serve to indicate the desirability of an investigation or other response. In other words, permitted read requests will be executed as shown by connector "A" and reference 518. But, if some operation other than a permissible read operation is attempted by the user in the context of the administrative jail 124 involved, the method 500 branches to reference 510.

At reference 510, the administrative jail 124 can check the privileges associated with the supposed administrative user 248 as defined by the corresponding administrative user configuration file 237. See reference 512. Should a mismatch be found, the administrative jail 124 often denies the request and might also issue an alert or take other appropriate action. See reference 520. If the requested operation (which might be a write operation to the administrative jails 124 of some type) satisfies the privileges of the supposed administrative user 248, method 500 continues by checking whether the supposed administrative user 248 is operating in the virtual root (or administrative jail 124) associated therewith. See connector "B" and reference 514. If not, something can often be assumed to be amiss and method 500 branches to reference 520. As with an impermissible read operation, reference 520 indicates that the administrative jail 124 denies the request. But, in the case of an unauthorized write attempt, it might be the case that more immediate action and/or alerting would be in order. The parent operating system 212 and/or the host administrative user 129 can be alerted and therefore respond accordingly.

In any case, after the administrative jail 124 either denies or executes a requested operation associated with itself, method 500 can include obtaining, analyzing, etc. syslog data 130. These reviews of which can be performed by the host administrative user 129, the administrative users 248, or both if desired. In addition or in the alternative, the parent operating system 212 and/or a user application 140 can generate a compliance/auditing report if desired. Moreover, the gathering of the syslog data 130 here (and in methods 300 and 400) can be performed continuously, periodically, on a scheduled basis, only when selected operations occur, etc. As disclosed elsewhere herein, the syslog data 130 can be gathered from those portions of the system 100 at which it is desired to detect, isolate, stop, hinder, correct for, mitigate, etc. malicious, negligent, unauthorized, and/or other apparently errant activity might be desired. See reference 522. More specifically, at reference 522 all events related to web access and/or logins can be logged even if valid to, for instance, keep track of those users who might be accessing a hosted web site 235, application database 125, user application 140, etc.

For content integrity monitoring purposes, syslog and tools other than syslog can be employed. For instance Tripwire® and/or FTimes can monitor the checksums of various files in the jails 122 and 124. If one of these tools detects a modification to a file it can alert the stack 200 and/or the host administrative user 129. In addition, such tools can run in the parent operating system 212 where they can remain hidden from all users 104, 106, and 248 except the host administrative user 129. This means, in part, that malicious users 106 (and even valid users 104 and 248) would be unaware of the tool and its monitoring efforts thereby making it more likely that a malicious (or accidental) change would be detected if attempted.

In the alternative, the stack 200 could allow administrative users 248 to choose which resources (that they own) within their administrative jails 124 (and for that matter, in the executive jails 122) which they wish to have monitored for content integrity. Of course, if an administrative user 248 were to be informed of this service they would not necessarily need to know how it might be performed. In this way, administrative users 248 would be free to perform certain administrative functions (such as changing variable in the configuration files 236 and 237) without causing needless alerts. In any case, reference 522 illustrates that syslog data 130 and/or the like can be monitored and reviewed as desired.

In any case, method 500 can repeat in whole, or in part, as desired as indicated at reference 524.

Security Implications

Thus, hosts 112 of various embodiments therefore place limits on the abilities of malicious users 106 and other users (and user applications 140 not written in accordance with good design/programming practices) to access, damage, or otherwise harm operating systems 212, user applications 140, web servers, etc. For instance, hosts 112 of some embodiments allow users (including administrative users 248) no authority to alter system variables, settings, etc. other than stopping and re-starting their hosted web sites 235, user applications 140, etc. Even these activities, though, can be detected via syslog reporting (and/or the like) so that an unusual pattern (or even an occurrence) of such events could trigger an investigation and/or corrective action. In some embodiments, it is predicted that the worst that a malicious user 106 might be able to manage is being able to control one hosted web site 235, one set of (commonly owned) user applications 140, or command of one administrative jail 124. Even so, that malicious user 106 would only be granted (by virtue of their attack) authority within those bounds and would further be limited to starting and/or stopping the (singular) hosted web site 235.

Accordingly, a malicious user 106 might be able to write sensitive credit card data to an executive jail 122. But, in embodiments, that malicious user 106 could not read such sensitive data from the executive jail 122 because of the differing versions of the user configuration files 237 and 238 in the respective jails 124 and 122. Moreover, the host firewall 114 might assist in mitigating the results of such events by denying the apparent administrative user's attempt to access the administrative user application 240 and/or application database 125 from the executive jails 122. As a result, even if a malicious users 106 gained command execution within an executive jail 122, that malicious user 106 could not brute force the credentials for the administrative user 248. Thus, it would still require an administrative user 248 operating from within the corresponding administrative jail 124 to read and/or edit such sensitive information. As a result, stacks 200 of embodiments provide improved security against malicious (or accidental) attacks and even against applications and/or web sites failing to meet good design/programming practices.

Furthermore, stacks 200 of the current embodiment would recognize an attempt to execute a file outside of an executive jail 122 (even the administrative version of a user application 240) as an unusual, suspicious, and likely malicious attack. Likewise, stacks 200 would recognize attempts to edit administrative user applications 240 (even the executable user applications 242) outside of the corresponding administrative jails 124 as yet another type of malicious attack (or at least something unusual enough to perhaps merit investigation).

Furthermore, while it might be possible for a malicious user 106 to damage, destroy, or copy an executable user application 242 and/or executive user configuration files 238 in an executive jail 122, that malicious user 106 cannot see, much less access, either the administrative jail(s) 124, the resources therein (except those that are specifically cross mounted to the executive jail 122 such as application binaries, source code, etc.), or the parent operating system 212 and the resources stored therein.

In addition, because the underlying system-level directories and files (in the parent file structure 214) are not writable for non-administrative users 104, even malicious users 106 in the executive jails 122 cannot modify existing system-level files or insert dangerous files in to hosted web sites 235 (or other aspects of stacks 200). In addition, because stacks 200 of some embodiments prevent egress from the executive jails 122, malicious users 106 will have much more difficulty with including, using, or leveraging external or remote files to mount RFI attacks on the hosted web sites 235 or other aspects of the system.

In the meantime, administrative users 248 can still access their administrative, and therefore, un-attacked versions of the user configuration file 237 and user applications 240. More specifically, administrative users 248 can access these resources and inspect, modify, etc. the same. Changes made to these resources (in the administrative jail 124) can be cross mounted to the corresponding executive jail 122 for execution therein (and only therein in some embodiments) at the discretion of the administrative user 248. In some embodiments, the stack 200 also password protects access to the administrative jails 124. This helps reduce the risk should a malicious user 106 compromise one of the other administrative jails 124 (or executive jails 122) and it does so while still giving administrative users 248 full administrative access to the administrative user applications 240. Thus, even if a malicious user 106 compromises one administrative jail 124, the stack 200 limits the resulting vulnerability to the administrative versions of their user applications 240 and administrative user configuration files 237 in that administrative jail 124 and not others. Of course, having two separate administrative jails 124 for some administrative users 248 would provide yet another level of redundancy in such situations whereby even a compromise of one of the two administrative jails 124 would leave the redundant administrative jail 124 in service in many scenarios.

Of course, changes made to their resources by an administrative user 248 (or a malicious user 106 acting as an administrative user 248) can be written to the parent operating system 212, but only within the corresponding administrative jail 124. A disk write of this information (or any other information) anywhere else would trigger a response from the stack 200. Thus, no other administrative jail 124 can be affected nor can the parent operating system 212 itself be attacked in such scenarios. Likewise, if some malicious user 106 compromises a particular administrative jail 124, any outbound malicious activity will be limited to that particular compromised administrative jail 124 and no others.

Moreover, because of certain firewall rules, VPN access requirements, etc. that are associated with administrative jails 124 of some embodiments, malicious users 106 cannot execute brute force attacks against the stack 200 for information regarding the administrative users 248 (for instance, their passwords). In the alternative, or in addition, stacks 200 of embodiments can help defeat phishing attempts by (at the web server application firewall level) modifying some or all of the relative path references on the web sites to fully qualified paths, so that malicious users 106 end up send referring URLs (Uniform Resource Locators) when they make copies of the site to be phished. This might make it a bit easier to copy the template login, registration, change password page, etc. that the malicious user 106 would likely make a copy of and modify to log the phished information (which once a user is phished is normally copied anyway) but more importantly it ends up sending these referring URLs back to the site. These referring URLS can be watched for and therefore detected and thwarted. Affected users can also be notified of these all-too-common attacks thereby improving overall user security. Moreover, embodiments provide web application firewalls either in front of the physical (web server) device on the Network or residing in the web server itself. These aspects of embodiments therefore deny malicious users 106 the ability to attack the hosts 112 and parent operating systems 212 directly.

As another result of the current disclosure, for a malicious users 106 to mis-use the privileges of an administrative user 248, not only must the administrative user 248 (or malicious user 106 acting there as) be authenticated and logged in through the VPN interface, but that malicious user 106 also has to take additional actions to compromise security. For instance, that malicious user 106 would have to force a CSRF of the administrative version of the hosted web site 235 or user application 240 in the administrative jail 124 (not in the executive jail 122 where it would fail for lack of privileges anyway). However, embodiments provide for adding nonces at the web server application firewall level on forms for subsequent verification during subsequent valid user sessions thereby aiding the detection and thwarting of such attacks.

Furthermore, even administrative users 248 of the hosts 110 cannot hack into each other's hosted web sites 235 or the administrative user applications 240. Nor can they alter or eliminate (after-the-fact) syslog data 130 or other security related information which might have been generated by their unusual, malicious, unauthorized, or apparently errant activities. Thus, while they might be able to insert erroneous and/or falsified syslog data 130, they will have difficulty modifying and/or concealing syslog data 130 created by their earlier activities because those activities logged concurrently with those earlier activities. Embodiments therefore provide secure operating systems, web server systems, and methods possessing self compliance/auditing abilities with respect to HIPAA, GLBA, Sarbanes-Oxley, PCI DSS, etc. rules.

CONCLUSION

Although the subject matter has been disclosed in language specific to structural features and/or methodological acts, it is to be understood that the subject matter defined in the appended claims is not necessarily limited to the specific features or acts disclosed above. Rather, the specific features and acts described herein are disclosed as illustrative implementations of the claims.

The invention claimed is:

1. A non-transitory machine readable medium storing machine executable instructions which when executed by the machine cause the machine to execute a method comprising:
    creating virtual roots for a plurality of executive jails separate from a parent operating system and separate from each other in a first set of locations in a parent file structure of the parent operating system;
    setting privileges associated with each of the individual executive jails to disk read-only for users accessing the executive jails via an interface with a wide area network;
    creating virtual roots for a plurality of administrative jails corresponding to the plurality of executive jails separate from the parent operating system, separate from each other, and separate from each of the executive jails in a second set of locations in the parent file structure of the parent operating system;
    hiding all of the administrative jails from all of the executive jails;
    hiding the parent operating system from all of the executive jails and from all of the administrative jails; and
    cross mounting a user configuration information from a first of the administrative jails in to a first of the executive jails corresponding to the first administrative jail.

2. The machine readable medium of claim 1 storing further instructions which when executed by the machine cause the machine to hide the parent file structure of the parent operating system from the executive jails and the administrative jails.

3. The machine readable medium of claim 1 storing further instructions which when executed by the machine cause the machine to mount a first user application from the first administrative jail in to the first executive jail.

4. The machine readable medium of claim 1 storing further instructions which when executed by the machine cause the machine to password protect each of the individual administrative jails.

5. The machine readable medium of claim 1 storing further instructions which when executed by the machine cause the machine to store security related syslog data related to an executive jail in a location associated with the parent file structure of the parent operating system.

6. The machine readable medium of claim 1 storing further instructions which when executed by the machine cause the machine to store web log related syslog data related to an executive jail in a location associated with the corresponding administrative jail.

7. A web server comprising:
    a processor and a memory coupled to the processor;
    an interface with a wide area network;
    a parent operating system;
    a plurality of executive jails to be created in virtual roots associated therewith and within the parent operating system and to be disk read-only as accessed by users over the interface with the wide area network interface;
    a plurality of administrative jails to correspond to the plurality of executive jails and to be created within virtual roots associated therewith and within the parent operating system and to be hidden from the executive jails, the parenting operating system to be hidden from the executive jails and from the administrative jails; and
    a user configuration information to be cross mounted from a first of the administrative jails in to a first of the executive jails to correspond to the first administrative jail.

8. The web server of claim 7 further comprising a parent file structure of the parenting operating system hidden from the executive jails and the administrative jails.

9. The web server of claim 7 further comprising a first user application to be cross mounted from the first administrative jail in to the first executive jail.

10. The web server of claim 7 wherein each of the administrative jails to be individually password protected.

11. The web server of claim 7 wherein the executive jails are restricted from initiating outbound communications via the interface to the wide area network.

12. The web server of claim 7 further comprising a location associated with a parent file structure of the parent operating system wherein security related syslog data related to a executive jail to be stored.

13. The web server of claim 7 further comprising a location associated with an administrative jail wherein web log related syslog data of a corresponding executive jail to be stored.

14. A method comprising:
    creating virtual roots for a plurality of executive jails within a parent operating system;
    setting privileges associated with each of the executive jails to disk read-only for users accessing the executive jails via an interface with a wide area network;
    creating virtual roots for a plurality of administrative jails corresponding to the plurality of executive jails within the parent operating system;
    hiding the administrative jails from the executive jails;
    hiding the parent operating system from the executive jails and from the administrative jails; and
    cross mounting a user configuration information from a first of the administrative jails in to a first of the executive jails corresponding to the first administrative jail.

15. The method of claim 14 further comprising hiding a parent file structure of the parent operating system from the executive jails and the administrative jails.

16. The method of claim 14 further comprising mounting a first user application from the first administrative jail in to the first executive jail.

17. The method of claim 14 further comprising password protecting each of the individual administrative jails.

18. The method of claim 14 further comprising restricting the executive jails from initiating outbound communications over the interface to the wide area network.

19. The web server of claim 14 further comprising storing security related syslog data related to an executive jail in a location associated with a root directory of the parent operating system.

20. The web server of claim 14 further comprising storing web log related syslog data related to a executive jail in a location associated with the corresponding administrative jail.

\* \* \* \* \*